(12) United States Patent
Yazawa et al.

(10) Patent No.: US 10,643,318 B2
(45) Date of Patent: May 5, 2020

(54) IMAGE DATA CONVERSION DEVICE, IMAGE DATA CONVERSION METHOD, IMAGE DATA CONVERSION PROGRAM, POS TERMINAL DEVICE, AND SERVER

(71) Applicant: NEC Platforms, Ltd., Kawasaki-shi, Kanagawa (JP)

(72) Inventors: Shou Yazawa, Kanagawa (JP); Yukio Yoshioka, Kanagawa (JP)

(73) Assignee: NEC Platforms, Ltd., Kawasaki-shi, Kanagawa (JP)

( * ) Notice: Subject to any disclaimer, the term of this patent is extended or adjusted under 35 U.S.C. 154(b) by 111 days.

(21) Appl. No.: 16/070,093

(22) PCT Filed: Dec. 14, 2016

(86) PCT No.: PCT/JP2016/005127
§ 371 (c)(1),
(2) Date: Jul. 13, 2018

(87) PCT Pub. No.: WO2017/134717
PCT Pub. Date: Aug. 10, 2017

(65) Prior Publication Data
US 2019/0035065 A1 Jan. 31, 2019

(30) Foreign Application Priority Data
Feb. 5, 2016 (JP) ................. 2016-020464

(51) Int. Cl.
*G06T 5/40* (2006.01)
*H04N 1/407* (2006.01)
(Continued)

(52) U.S. Cl.
CPC ............. *G06T 5/40* (2013.01); *G06T 5/009* (2013.01); *G06T 7/90* (2017.01); *H04N 1/407* (2013.01);
(Continued)

(58) Field of Classification Search
CPC .. G06T 5/40; G06T 7/90; G06T 5/009; G06T 2207/10024; H04N 1/4074; H04N 1/46;
(Continued)

(56) References Cited

U.S. PATENT DOCUMENTS 7,406,193 B2 * 7/2008 Watanabe ............... G06T 5/009
348/135
8,031,378 B2 10/2011 Suzuki
(Continued)

FOREIGN PATENT DOCUMENTS

| CN | 104484864 A | 4/2015 |
|---|---|---|
| JP | 10-134178 A | 5/1998 |

(Continued)

OTHER PUBLICATIONS

International Search Report for PCT/JP2016/005127 dated Feb. 14, 2017 [PCT/ISA/210].
(Continued)

*Primary Examiner* — Nizar N Sivji
(74) *Attorney, Agent, or Firm* — Sughrue Mion, PLLC

(57) ABSTRACT

In an image data conversion device, color image data is represented in gray scale, a histogram of brightness values is created for the gray-scaled image data, it is determined based on the created histogram which image pattern of a plurality of image patterns the gray-scaled image data is classified into, a range subjected to gamma correction and a range fixed to at least one of a minimum value and a maximum value of gray scale are set for each image pattern, and image data conversion including the gamma correction is performed on the gray-scaled image data.

11 Claims, 34 Drawing Sheets

(51) Int. Cl.
*H04N 1/46* (2006.01)
*H04N 1/60* (2006.01)
*G06T 7/90* (2017.01)
*G06T 5/00* (2006.01)
*H04N 1/40* (2006.01)

(52) U.S. Cl.
CPC ....... *H04N 1/40012* (2013.01); *H04N 1/4074* (2013.01); *H04N 1/46* (2013.01); *H04N 1/465* (2013.01); *H04N 1/60* (2013.01); *H04N 1/6005* (2013.01); *G06T 2207/10024* (2013.01)

(58) Field of Classification Search
CPC ...... H04N 1/407; H04N 1/60; H04N 1/40012; H04N 1/465; H04N 1/6005
See application file for complete search history.

(56) References Cited

U.S. PATENT DOCUMENTS

| | | | |
|---|---|---|---|
| 9,100,598 B2* | 8/2015 | Kaminaga | G02B 21/16 |
| 10,291,955 B2* | 5/2019 | Toma | H04N 21/435 |
| 2003/0012437 A1* | 1/2003 | Zaklika | G06T 5/009 |
| | | | 382/169 |
| 2003/0053690 A1* | 3/2003 | Trifonov | G06T 5/009 |
| | | | 382/168 |
| 2009/0027545 A1* | 1/2009 | Yeo | G06T 5/009 |
| | | | 348/362 |
| 2011/0052060 A1 | 3/2011 | Furuya | |

FOREIGN PATENT DOCUMENTS

| | | |
|---|---|---|
| JP | 2002-077616 A | 3/2002 |
| JP | 2006-186753 A | 7/2006 |
| JP | 2008-271418 A | 11/2006 |
| JP | 2010-062919 A | 3/2010 |
| JP | 2010-187093 A | 8/2010 |
| JP | 2011-071952 A | 4/2011 |

OTHER PUBLICATIONS

Notification Reasons for Refusal for JP 2016-020464 dated Oct. 24, 2016.
Notification Reasons for Refusal for JP 2017-153844 dated Oct. 24, 2017.
Communication dated May 5, 2019, from The China National Intellectual Property Administration in counterpart Application No. 201680079646.0.

* cited by examiner

IMAGE NOT INCLUDED IN ANY OF PATTERNS P1 TO P5

A: FIRST CONVERSION EQUATION DIVISION POINT
B: SECOND CONVERSION EQUATION DIVISION POINT
Z: BEFORE-CONVERSION BRIGHTNESS VALUE

IMAGE DATA CONVERSION DEVICE, IMAGE DATA CONVERSION METHOD, IMAGE DATA CONVERSION PROGRAM, POS TERMINAL DEVICE, AND SERVER

CROSS REFERENCE TO RELATED APPLICATIONS

This application is a National Stage of International Application No. PCT/JP2016/005127 filed Dec. 14, 2016, claiming priority based on Japanese Patent Application No. 2016-020464 filed Feb. 5, 2016, the disclosure of which is incorporated herein in its entirety by reference.

TECHNICAL FIELD

The present invention relates to an image data conversion device, an image data conversion method, an image data conversion program, a POS terminal device, and a server and, in particular, relates to an image data conversion device, an image data conversion method, an image data conversion program, a POS terminal device, and a server that represent color image data in gray scale to convert the color image data to black-and-white image data.

BACKGROUND ART

Patent Literature 1 discloses that, in an image processing device, a brightness distribution of an image is determined from a histogram of the number of pixels having component values for the brightness of an image indicated by image data, one of a plurality of gradation correction conditions is selected based on the determination, and the selected gradation correction condition is used to correct the component of the brightness.

Patent Literature 2 discloses that a histogram of a black-and-white multi-value image is created, a peak of the brightness of the black-and-white multi-value image is detected, and, based thereon, a brightness averaging conversion table or a brightness conversion table of the black-and-white multi-value image is used for conversion.

Patent Literature 3 discloses that it is determined whether or not an image is a night scene photography based on the feature of the entire image data, a subject is determined based on the feature of high brightness pixels in the image data, and gradation correction to the night scene photography is changed based on the determination of the subject.

CITATION LIST

Patent Literature

PTL 1: Japanese Patent Application Publication No. 2002-077616
PTL 2: Japanese Patent Application Publication No. H10-134178
PTL 3: Japanese Patent Application Publication No. 2010-062919

SUMMARY OF INVENTION

There are various color images such as an entirely bright image, an entirely dark image, or the like, and therefore, when color image data converted to gray-scaled black-and-white image data, it is difficult to perform appropriate correction in accordance with characteristics of a color image and perform image data conversion.

A first aspect of the present invention is an image data conversion device including: gray scale operation means for representing color image data in gray scale; histogram creation means for creating a histogram of brightness values for the gray-scaled image data; determination means for, based on the created histogram, determining which image pattern of a plurality of image patterns the gray-scaled image data is classified into; and image data conversion means for setting a range subjected to gamma correction and a range fixed to at least one of a minimum value and a maximum value of gray scale for each image pattern and performing image data conversion including the gamma correction on the gray-scaled image data.

A second aspect of the present invention is an image data conversion method in an image data conversion device, the method comprising: representing color image data in gray scale; creating a histogram of brightness values for the gray-scaled image data; based on the created histogram, determining which image pattern of a plurality of image patterns the gray-scaled image data is classified into; and setting a range subjected to gamma correction and a range fixed to at least one of a minimum value and a maximum value of gray scale for each image pattern and performing image data conversion including the gamma correction on the gray-scaled image data.

A third aspect of the present invention is an image data conversion program that causes a computer to function as: means for representing color image data in gray scale; means for creating a histogram of brightness values for the gray-scaled image data; means for, based on the created histogram, determining which image pattern of a plurality of image patterns the gray-scaled image data is classified into; and means for setting a range subjected to gamma correction and a range fixed to at least one of a minimum value and a maximum value of gray scale for each image pattern and performing image data conversion including the gamma correction on the gray-scaled image data.

A fourth aspect of the present invention is a computer storing the image data conversion program described above in a storage unit, wherein a CPU converts the color image data to the gray-scaled black-and-white image data based on the image data conversion program.

A fifth aspect of the present invention is a POS terminal device comprising: the image data conversion device described above; and a printing unit that uses black-and-white image data converted by the image data conversion device for printing.

A sixth aspect of the present invention is a server connected to a terminal device via a communication network, the server comprising: the image data conversion device described above; and a communication unit that receives color image data from the terminal device, converts the received color image data to black-and-white image data by using the image data conversion device, and transmits the converted black-and-white image data to the terminal device.

Advantageous Effects of Invention

According to the present invention, an image data conversion device, an image data conversion method, an image data conversion program, a POS terminal device, and a server that perform appropriate correction in accordance with characteristics of a color image at image data conversion and convert color image data to black-and-white image data can be provided.

DESCRIPTION OF EMBODIMENTS

Each example embodiment of the present invention will be described below in detail using drawings.

First, the art related to the present invention will be described prior to description of each example embodiment of the present invention.

In printers such as a thermal printer, the number of gradations for printing is limited, and image conversion (image conversion to monochrome 16 gradations) is required in accordance with a printer when a photograph, an illustration, or the like is printed.

In image conversion, however, simple monochrome 16 gradations may not often result in a clearly printed image. In this case, although improvement is possible by image correction, there are problems below:

knowledge of image correction is required.

complex operation of determining correction values manually by a cut-and-try approach is required.

Figure 1:
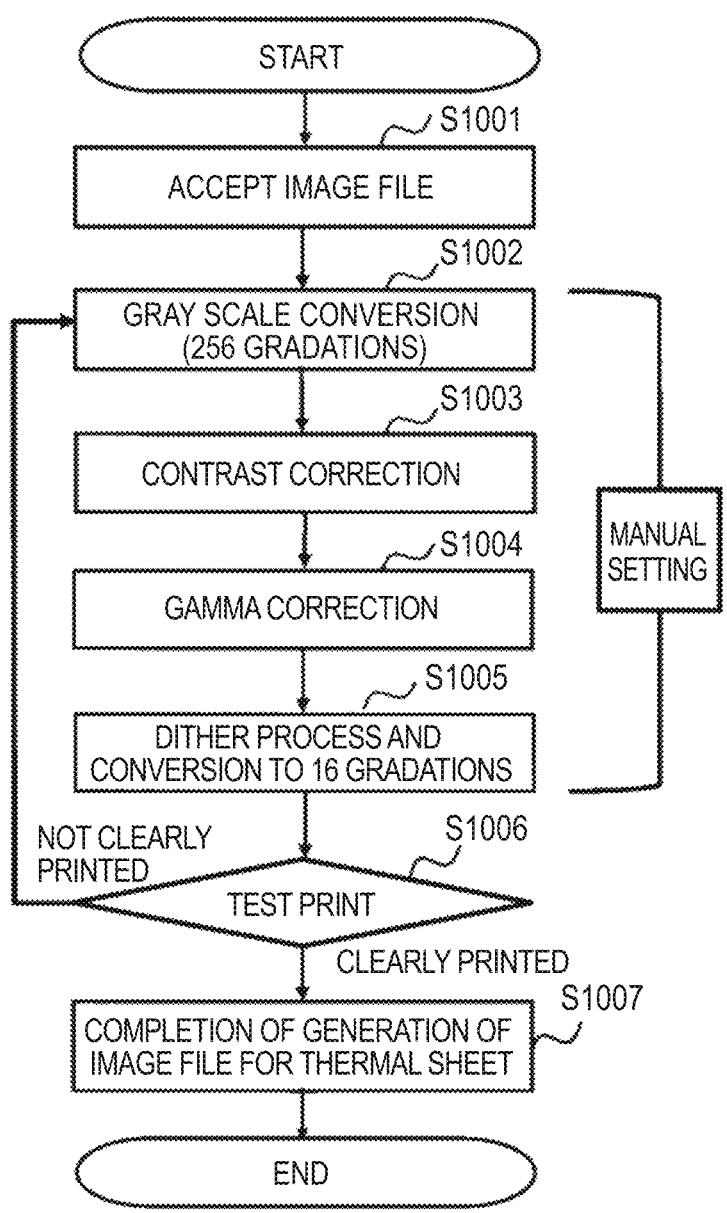
FIG. 1 is a flowchart illustrating a first image data conversion method of the art associated with the present invention.

A first image data conversion method of the art associated with the present invention will be specifically described below by using a flowchart of FIG. 1. As illustrated in FIG. 1, once an image file is accepted (step S1001), after conversion to gray scale of black-and-white 256 gradations (step S1002), contrast correction is performed (step S1003), gamma correction is performed (step S1004), and dither correction and conversion from 256 gradations to 16 gradations are performed (step S1005). Test printing is then performed (step S1006), and when no clean print is made, the settings of respective processes of step S1002 to step S1005 are manually changed, and respective processes of step S1002 to step S1005 are performed. Further, change of settings of respective processes of step S1002 to step S1005 and respective processes from step S1002 to step S1005 are repeated until a clean print is obtained. When a clean print is made, generation of an image file used for a thermal sheet is completed (step S1007).

Note that a gray-scale operation is to convert color image data to image data which is represented with only light and shade ranging from white to black, and there are conversion methods below:

NTSC-based weighting average: each of RGB pixels is weighted and converted to an averaged gray scale value.

Intermediate value method: the average of the maximum value and the minimum value of each of RGB pixels is converted to a gray scale value.

Simple averaging method: the average value of each of RGB pixels is converted to a gray scale value.

Contrast correction is to correct the difference in brightness between a bright portion and a dark portion. A high contrast results in such representation that white and black appear to be clearly divided, and a low contrast results in such representation that white and black are not distinguished and both appear as similar gray.

Gamma correction is to adjust correlation between color data of an image or the like and an actually output signal to obtain an image close to original data as much as possible. A normal value of the gamma value is assumed to 1. A gamma value above 1 results in blocked up shadows, and a gamma value below 1 results in blown out highlights.

Dither correction is correction that compensates a limitation of the number of display colors and represents smoother color gradations. The error diffusion method is one of the dither correction operation and used in a digital camera, an image scanner, a printer, a FAX, or the like. In the error diffusion method, the gradations of colors that can be displayed are limited, and when representation with finer gradations (greater number of colors) is intended, an image is represented as a group of fine dots, deeper color dots are concentrated in a deeper color portion, and the density of dots is reduced in a lighter color portion. Thereby, it appears as if the representation were made with the number of colors greater than the actual number of colors.

The first image data conversion method described above has the following problems:

It is necessary to know effects of respective correction operations.

It is necessary to manually perform settings of respective processes from step S1002 to step S1005.

It is necessary to repeat respective processes with a cut-and-try approach in order to obtain a clean result.

Correction has a limit because step S1002 to step S1005 are simple image correction operations. It is necessary to prepare a separate external tool to perform advanced correction.

Figure 2:
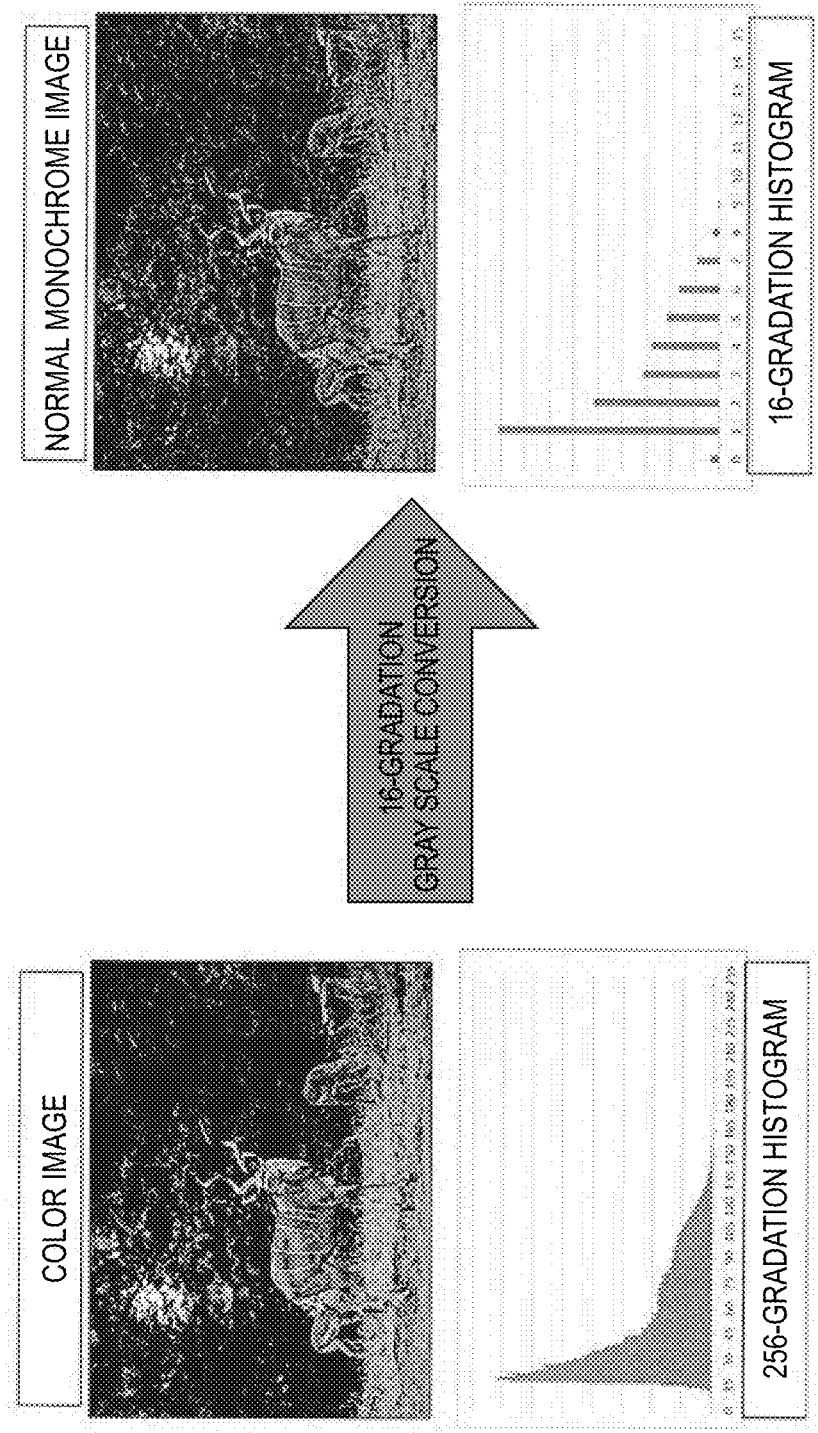
FIG. 2 is a diagram illustrating a histogram when 256 gradations of a color image are converted to 16 gradations of a black-and-white image in the first image data conversion method of the art associated with the present invention.

When the first image data conversion method described above is used and when an image having unbalance brightness is printed, the number of gradations used in an image is reduced because colors of 16 gradations are allocated to the entire brightness range, which results in an indistinct print with blocked up colors. FIG. 2 is a diagram illustrating a histogram when 256 gradations of a color image are converted to 16 gradations of a black-and-white image. Improvement to correct an image so as to use the entire gradation range of a printer is considered to be effective for such an image data conversion method.

Next, a second image data conversion method of the art associated with the present invention will be described by using a flowchart of FIG. 3. The second image data conversion method is a method in which manually set image correction is automated.

Figure 3:
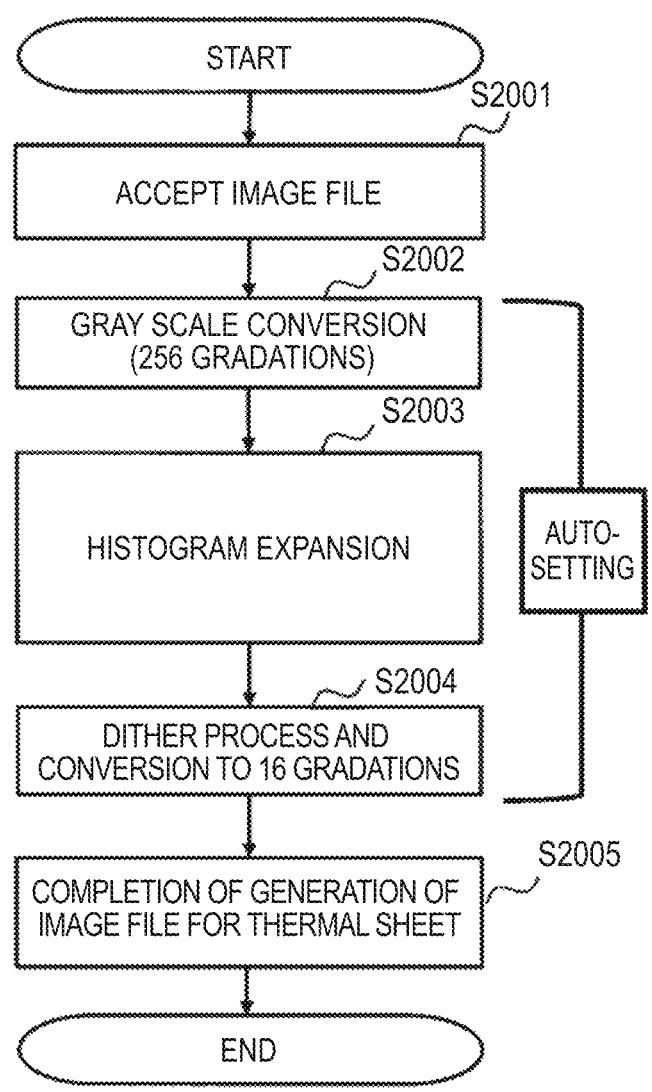
FIG. 3 is a flowchart illustrating a second image data conversion method of the art associated with the present invention.

As illustrated in FIG. 3, once an image file is accepted (step S2001), after conversion to gray scale of black-and-white 256 gradations (step S2002), histogram expansion is performed (step S2003), dither correction and conversion from 256 gradations to 16 gradations are performed (step S2004), and generation of an image file used for a thermal sheet is completed (step S2005).

The second image data conversion method employs histogram expansion for image correction as a countermeasure for improving the first image data conversion method. Here, a gray scale conversion method is NTSC-based weight averaging expressed by the following equation (Math. 1).

$$Y = R*0.299 + G*0.587 + B*0.114 \qquad \text{[Math. 1]}$$

Y: Brightness value, R: red component, G: green component, B: blue component

Gray scale conversion is possible also with other methods (an intermediate value method or a simple averaging method).

The second image data conversion method employs histogram expansion for image correction.

Figure 4:
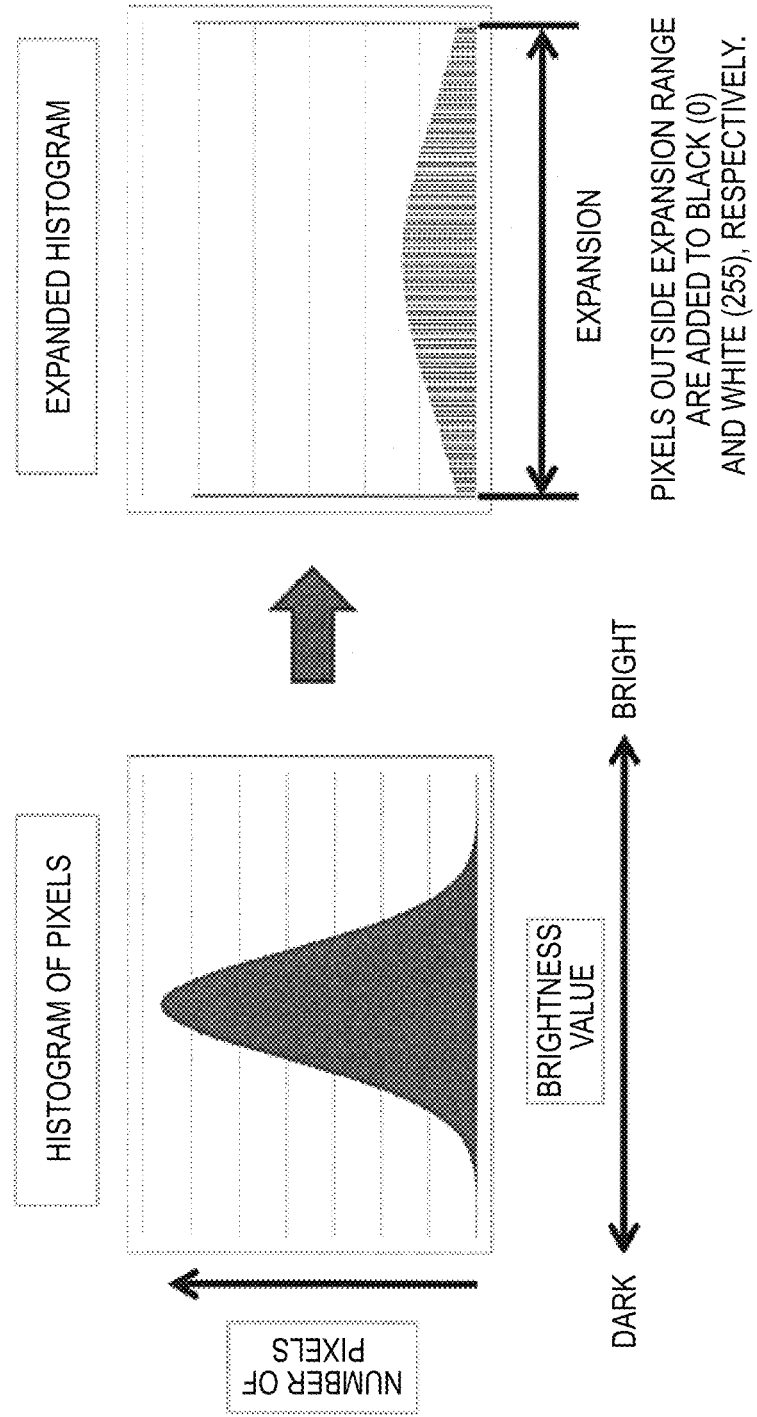
FIG. 4 is a diagram illustrating a histogram expansion used in the second image data conversion method.
Figure 5:
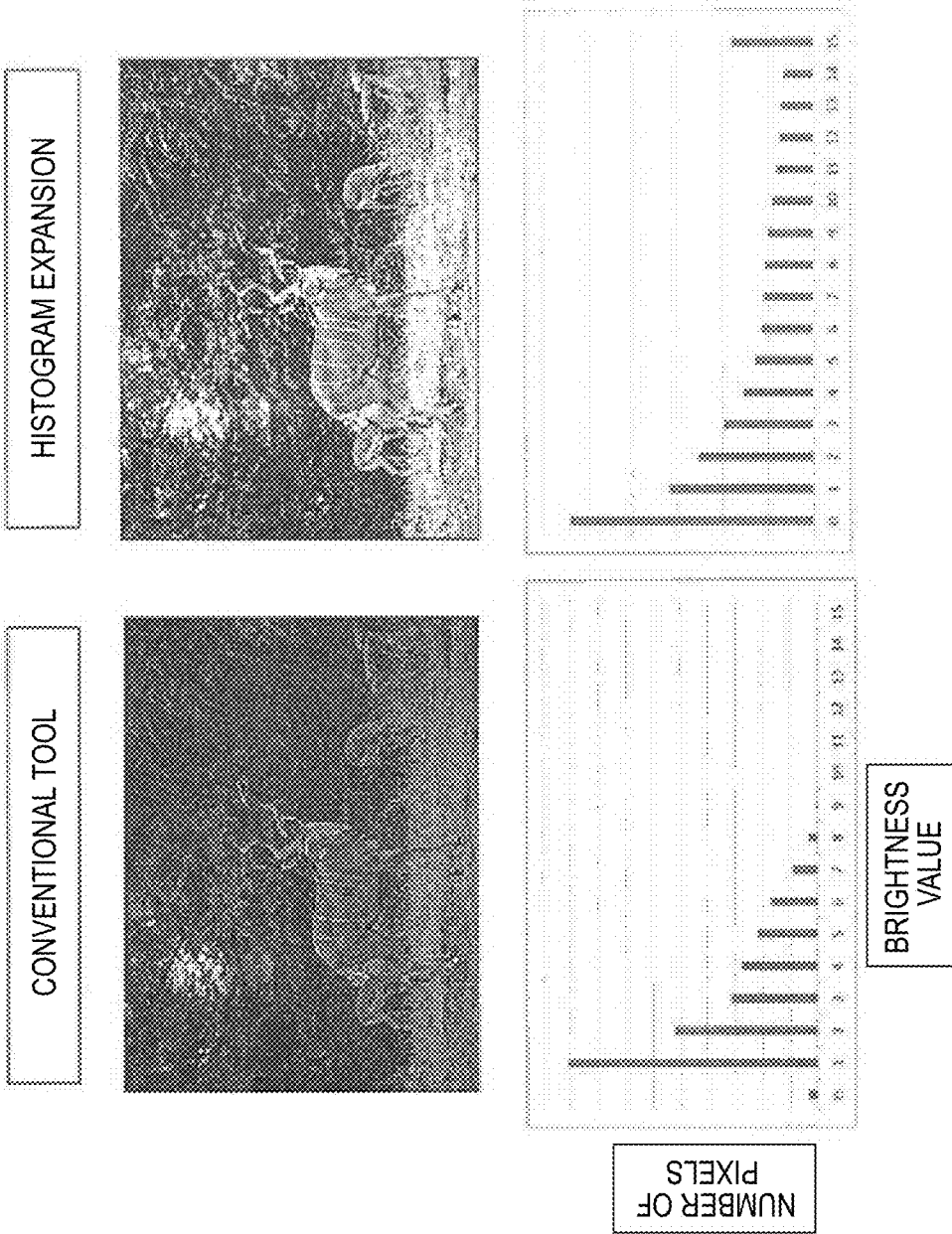
FIG. 5 is a diagram illustrating a result of image data conversion by the second image data conversion method.

As illustrated in FIG. 4, histogram expansion is a scheme that determines a range of expansion from a histogram of an image, performs expansion of that range, and corrects it to an image in which contrast is emphasized. While contrast correction used in the first image data conversion method is a conversion method having a limited correction width, performing histogram expansion allows higher contrast to be obtained. Then, as illustrated in FIG. 5, with contrast emphasis using histogram expansion, it is possible to obtain an image which is significantly clearer than that in the first image data conversion method.

Figure 6:
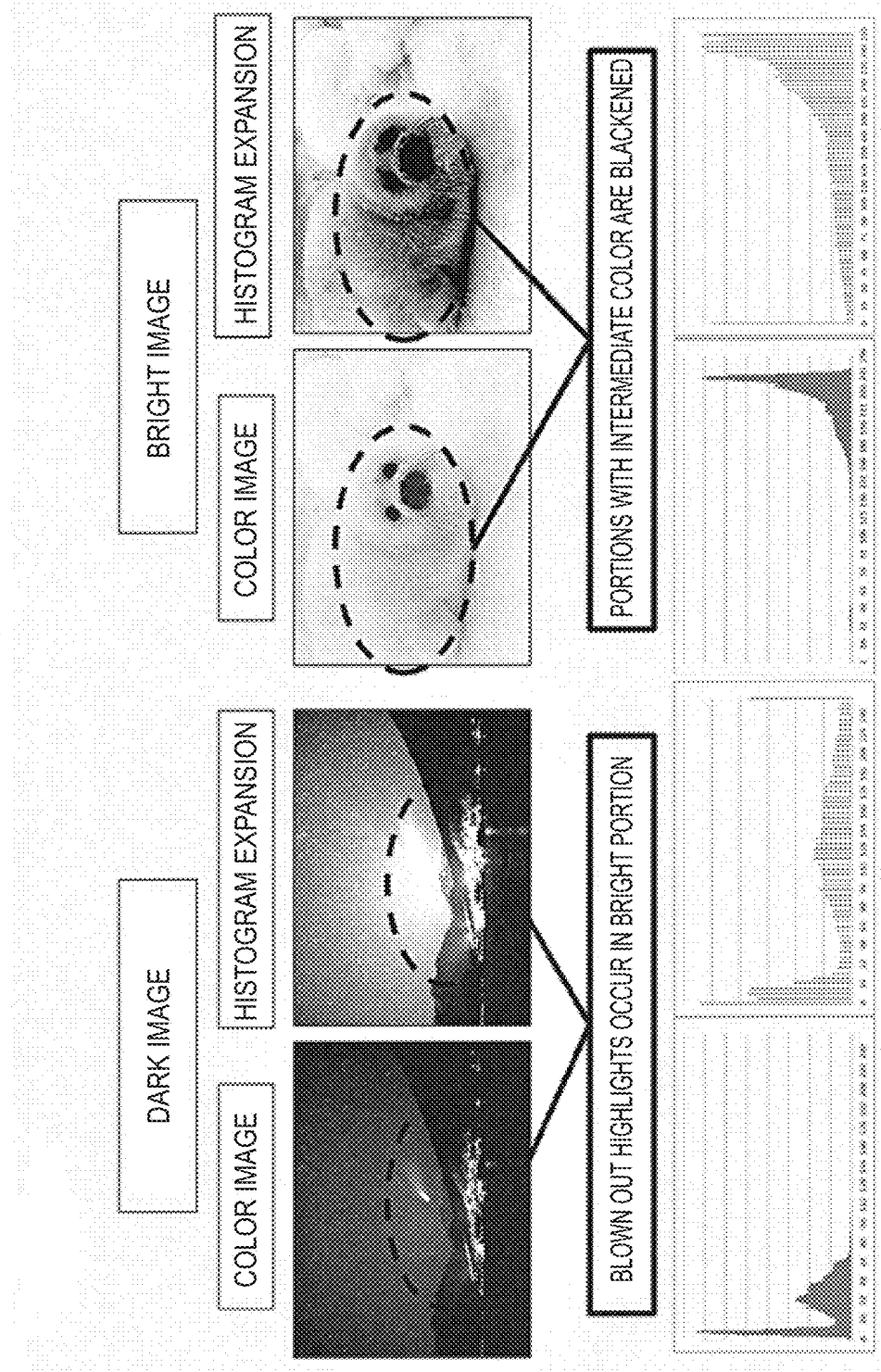
FIG. 6 is a diagram illustrating a problem of image data conversion by the second image data conversion method.

As illustrated in FIG. 6, however, in some of entirely bright images or dark images, there is a problem that performing histogram expansion causes the expansion range to be considerably wide and results in excessive image conversion.

A problem in the range for performing histogram expansion causes blown out highlights or blocked up shades to occur. Since the range of expansion is determined based on the ratio of pixels, various images can be addressed, however, which may cause an excessive expansion range.

Figure 7:
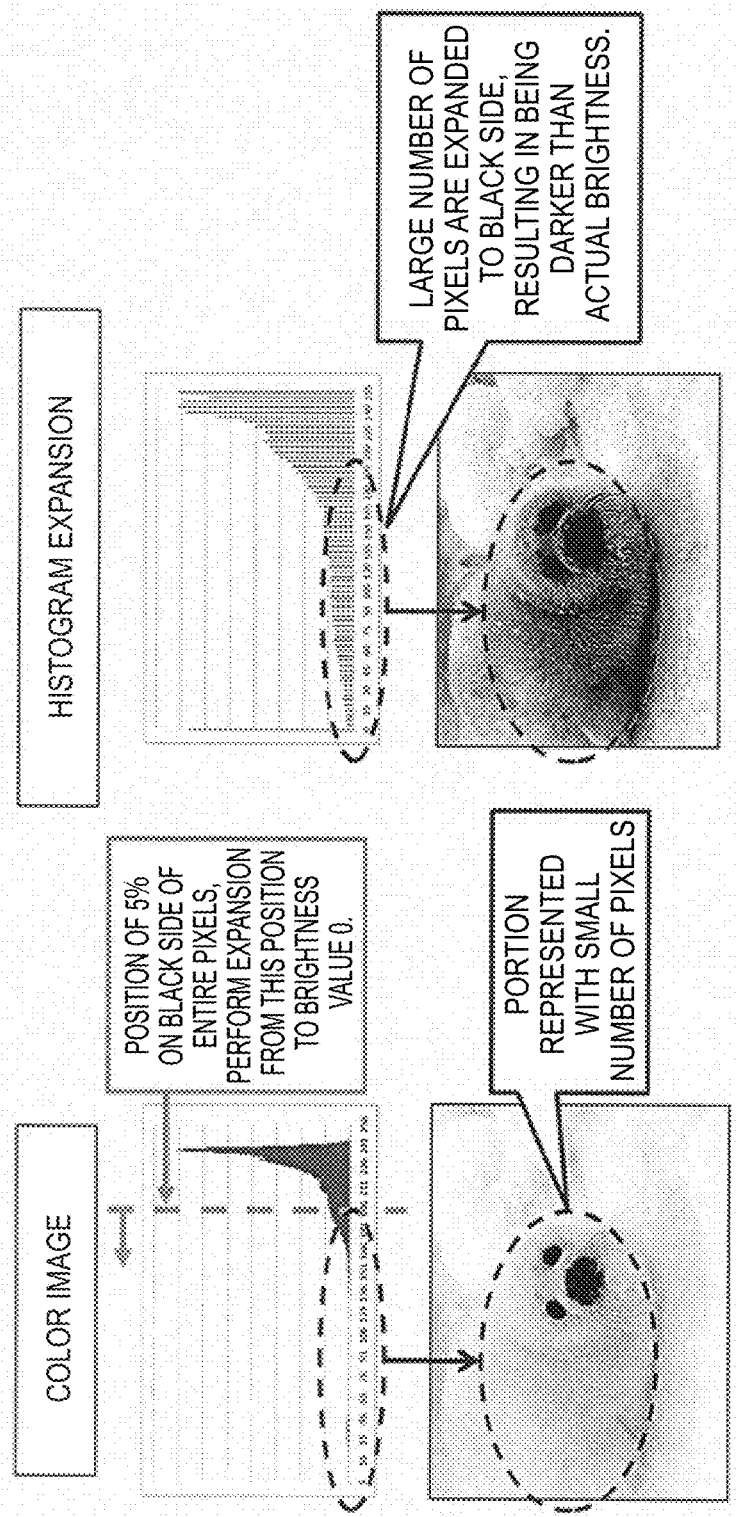
FIG. 7 is a diagram illustrating a problem of image data conversion for an entirely bright image by the second image data conversion method.

As illustrated in FIG. 7, when histogram expansion for an entirely bright image is performed, since expansion from the position of 5% on the black side of the whole number of pixels is performed, expansion is undesirably performed up to the brightness position away from the actual brightness, which results in a darkened image.

Figure 8:
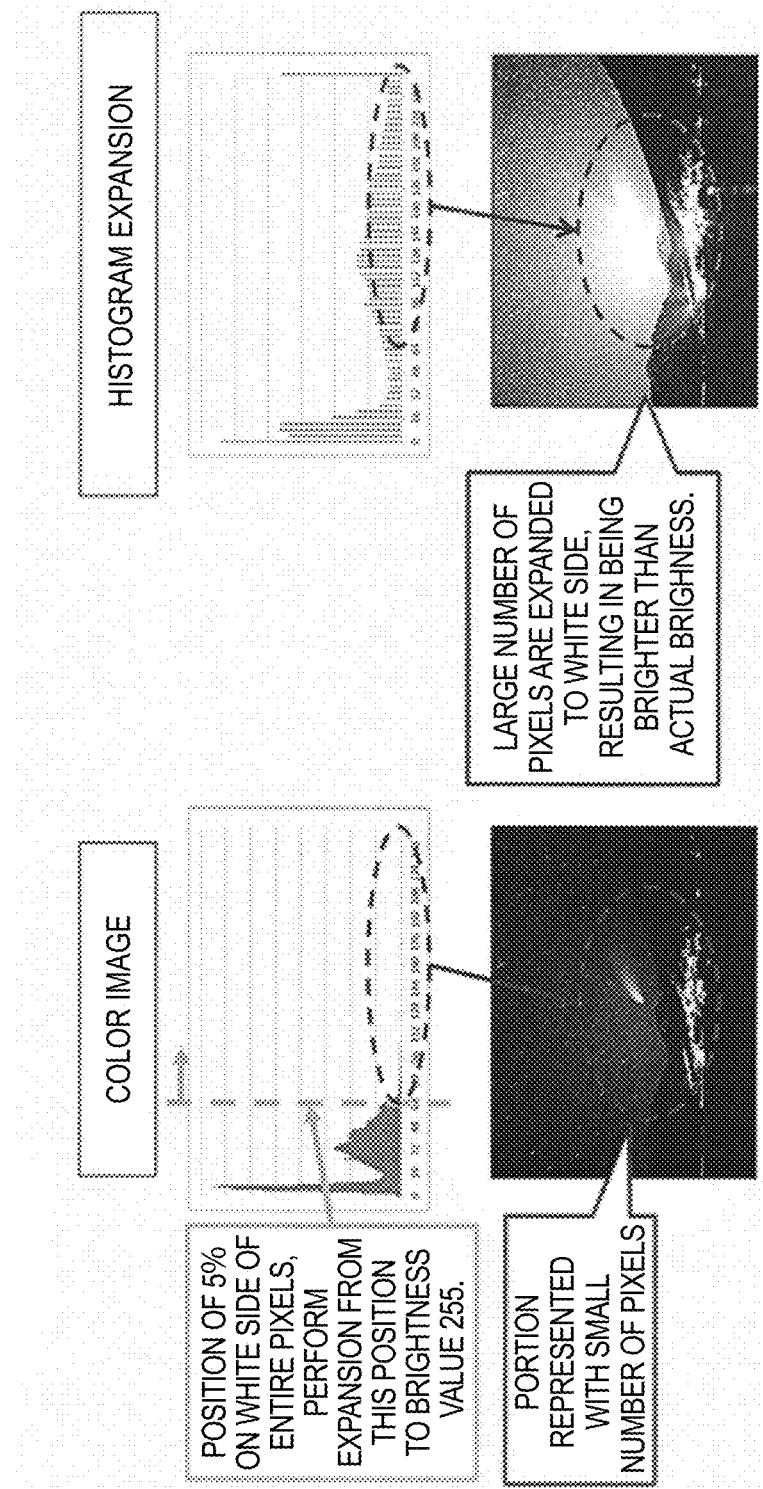
FIG. 8 is a diagram illustrating a problem of image data conversion for an entirely dark image by the second image data conversion method.

As illustrated in FIG. 8, since expansion from the position of 5% on the white side of the whole number of pixels is performed in histogram expansion also for an entirely dark image, expansion is undesirably performed up to the brightness position away from the actual brightness, which causes blown out highlights to occur.

Since expansion up to a position away from the actual brightness undesirably causes blown out highlights or blocked up shades to occur, the effect thereof cannot be obtained in some of images even with histogram expansion being performed.

An image data conversion device of each example embodiment of the present invention that solves the technical problems described above will be described below.

[First Example Embodiment]

Figure 9:
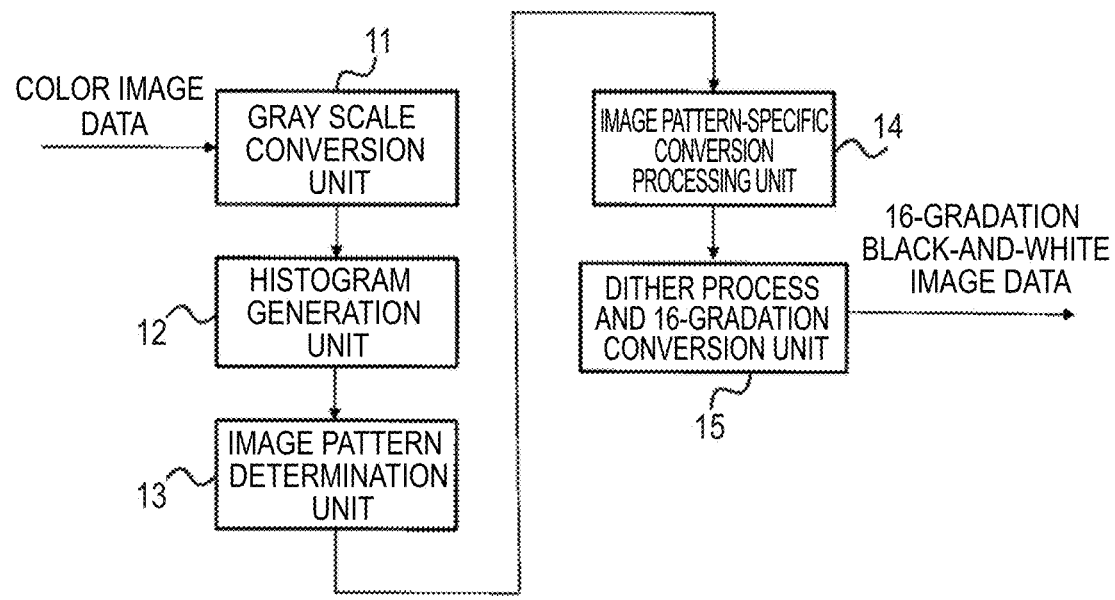
FIG. 9 is a block diagram illustrating one configuration example of an image data conversion device of a first example embodiment of the present invention.

FIG. 9 is a block diagram illustrating one configuration example of the image data conversion device of a first example embodiment of the present invention. As illustrated in FIG. 9, the image data conversion device of the present example embodiment has a gray scale conversion unit 11, a histogram generation unit 12, an image pattern determination unit 13, an image pattern-specific conversion processing unit 14, and a dither process and 16-gradation conversion unit 15.

Figure 10:
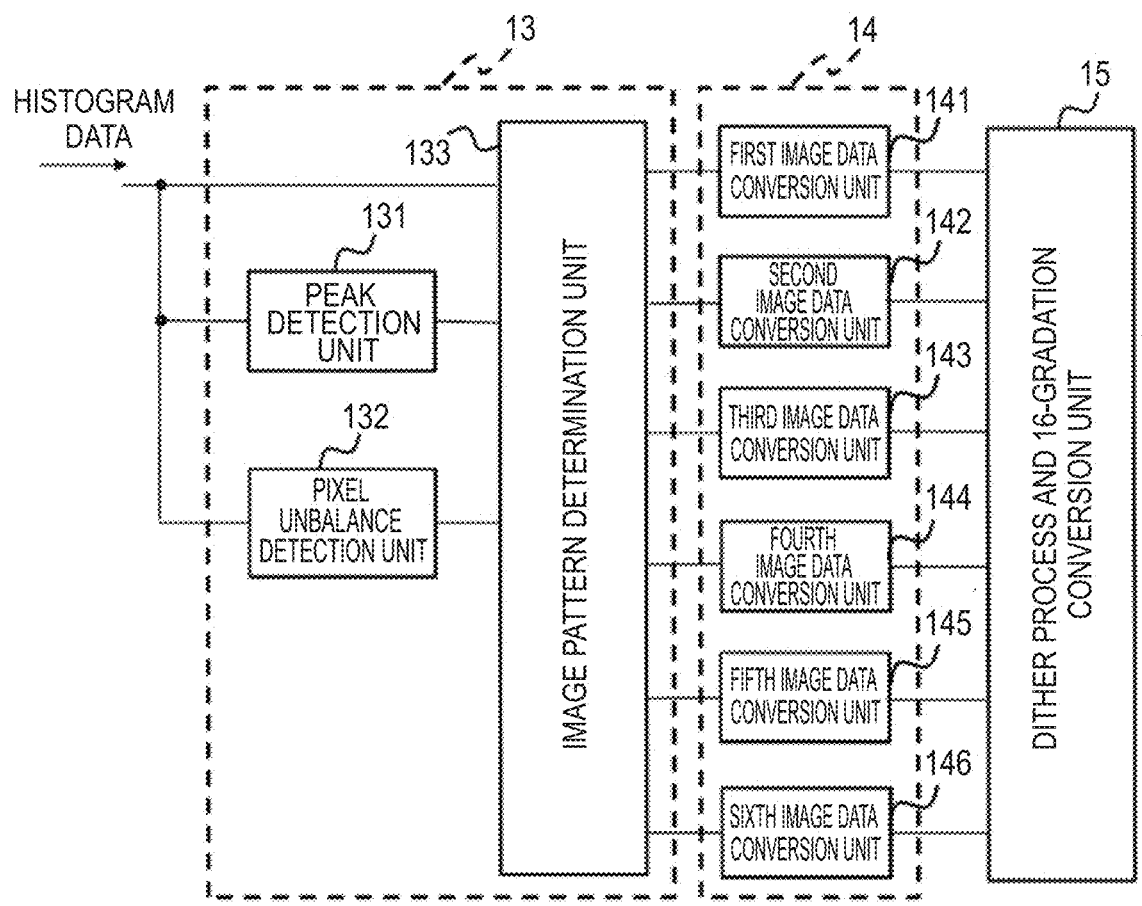
FIG. 10 is a block diagram illustrating a configuration example of an image pattern determination unit and an image pattern-specific conversion processing unit of the image data conversion device illustrated in FIG. 9.

FIG. 10 is a block diagram illustrating a configuration example of the image pattern determination unit 13 and the image pattern-specific conversion processing unit 14. As illustrated in FIG. 10, the image pattern determination unit 13 has a peak detection unit 131, a pixel unbalance detection unit 132, and an image pattern determination unit 133. The image pattern-specific conversion processing unit 14 has six image data conversion units of first image data conversion unit 141 to sixth image data conversion unit 146. The first image data conversion unit 141 to the sixth image data conversion unit 146 perform image data conversion processes for image patterns P1 to P6 described later, respectively.

The image data conversion device illustrated in FIG. 9 and FIG. 10 is configured with hardware. When configured with hardware, some or all of the components of the image data conversion device illustrated in FIG. 9 and FIG. 10 can be configured using an integrated circuit such as a Large Scale Integrated circuit (LSI), an Application Specific Integrated Circuit (ASIC), a gate array, a Field Programmable Gate Array (FPGA), or the like, for example.

Partial or whole function of the image data conversion device illustrated in FIG. 9 can be implemented by software. Further, partial or whole function of the image pattern determination unit 13 and the image pattern-specific conversion processing unit illustrated in FIG. 10 can be implemented by software. As used herein, the expression "implemented by software" means being implemented by a computer loading and executing a program.

Figure 11:
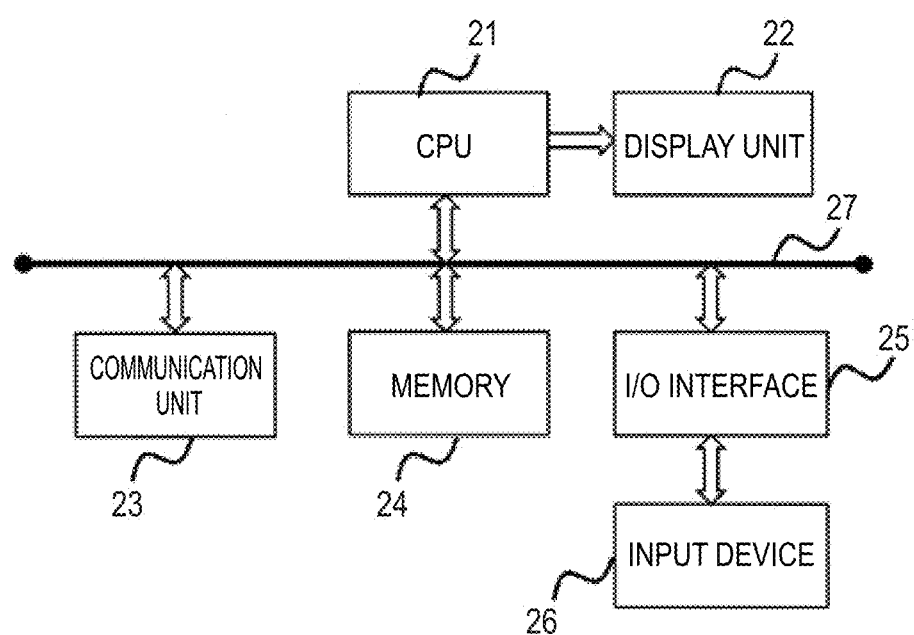
FIG. 11 is a block diagram illustrating one configuration example of a computer that functions as the image data conversion device of the first example embodiment of the present invention.

When partial or whole function of the image data conversion device is implemented by software, a computer illustrated in FIG. 11 may be used.

When configured with software, a computer formed of a storage unit such as a hard disk or a ROM storing a program describing the function, a display unit such as a liquid crystal display, a data storage unit such as a DRAM storing data necessary for operation, a CPU, and a bus connecting respective units are caused to store information necessary for operation in the DRAM and operate the program at the CPU and thereby functions of some or all of the components of the image data conversion device illustrated in FIG. 9 and FIG. 10 can be implemented. One example of the configuration of such a computer is illustrated in FIG. 11.

FIG. 11 is a block diagram illustrating one configuration example of a computer that functions as the image data conversion device. As illustrated in FIG. 11, the computer that implements the functions of the image data conversion device has a central processing unit (CPU) 21 as a processor, a display unit 22, a communication unit 23, a memory 24 (to be the storage unit and the data storage unit), an input/output (I/O) interface 25, an input device 26, and a bus line 27 that connects the CPU 21, the communication unit 23, the memory 24, the I/O interface 25 to each other.

The program may be stored using various types of non-transitory computer readable media and supplied to a computer. The non-transitory computer readable medium includes various types of tangible storage media. Examples of the non-transitory computer readable medium include a magnetic storage medium (for example, a flexible disk, a magnetic tape, a hard disk drive), magneto-optical storage medium (for example, a magneto-optical disk), CD-read only memory (ROM), CD-R, CD-R/W, and a semiconductor memory (for example, a mask ROM, a programmable ROM (PROM), an Erasable PROM (EPROM), a flash ROM, a random access memory (RAM)). Further, a program may be supplied to a computer through various types of transitory computer readable media. Examples of the transitory computer readable medium include an electrical signal, an optical signal, and an electromagnetic wave. The transitory computer readable medium can supply a program to a computer via a wired communication path such as a power line and an optical fiber or a wireless communication path.

Note that that the image data conversion device illustrated in FIG. 9 and FIG. 10 can be configured with hardware and that partial or whole of the image data conversion device can be implemented by software are the same as in the second and third example embodiments described later.

Figure 12:
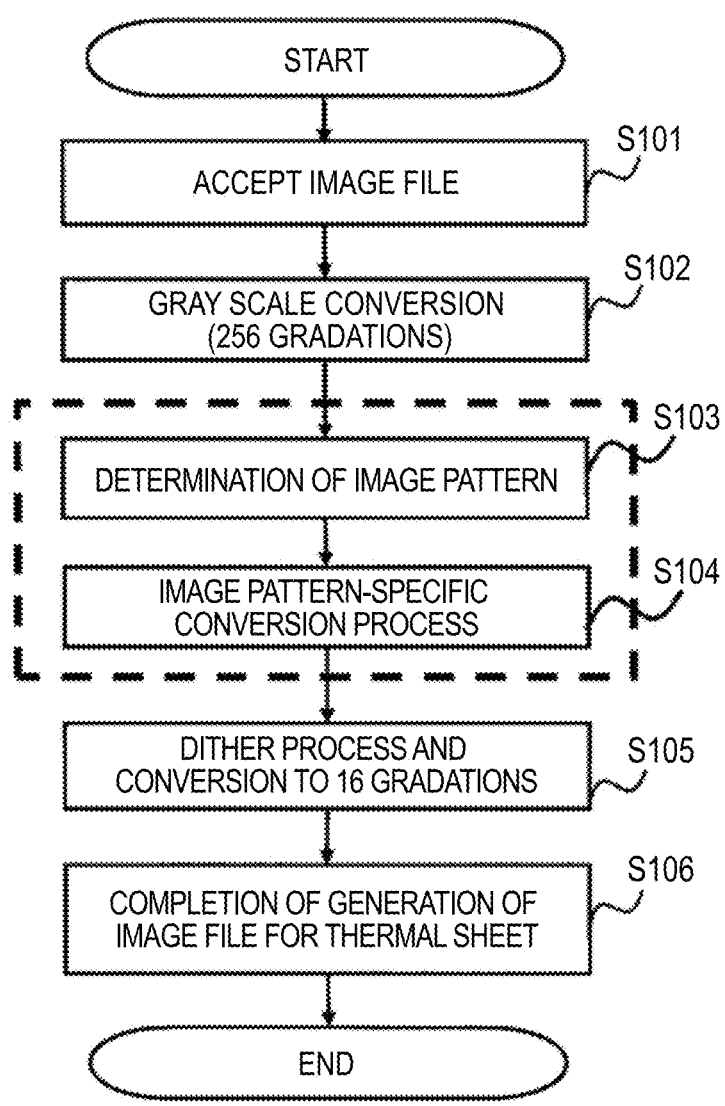
FIG. 12 is a flowchart illustrating a process performed by the image data conversion device of the first example embodiment.

A process performed by the image data conversion device of the present example embodiment will be described with reference to a flowchart of FIG. 12.

Once the image data conversion device accepts an image file (step S101), after conversion to gray scale of black-and-white 256 gradations by using the gray scale conversion unit 11 (step S102), the image data conversion device performs image pattern determination (step S103) and image pattern-specific conversion process (step S104) and performs dither correction and conversion from 256 gradations to 16 gradations (step S105), and generation of an image file used for a thermal sheet is completed (step S106).

In the image data conversion device of the present example embodiment, the image pattern determination process (step S103) and the image pattern-specific conversion process (step S104) are provided.

The image pattern determination process is a process of detecting a feature of an image to determine an image pattern. The image pattern-specific conversion process is a process of performing a correction process for each of the determined image patterns.

Figure 13:
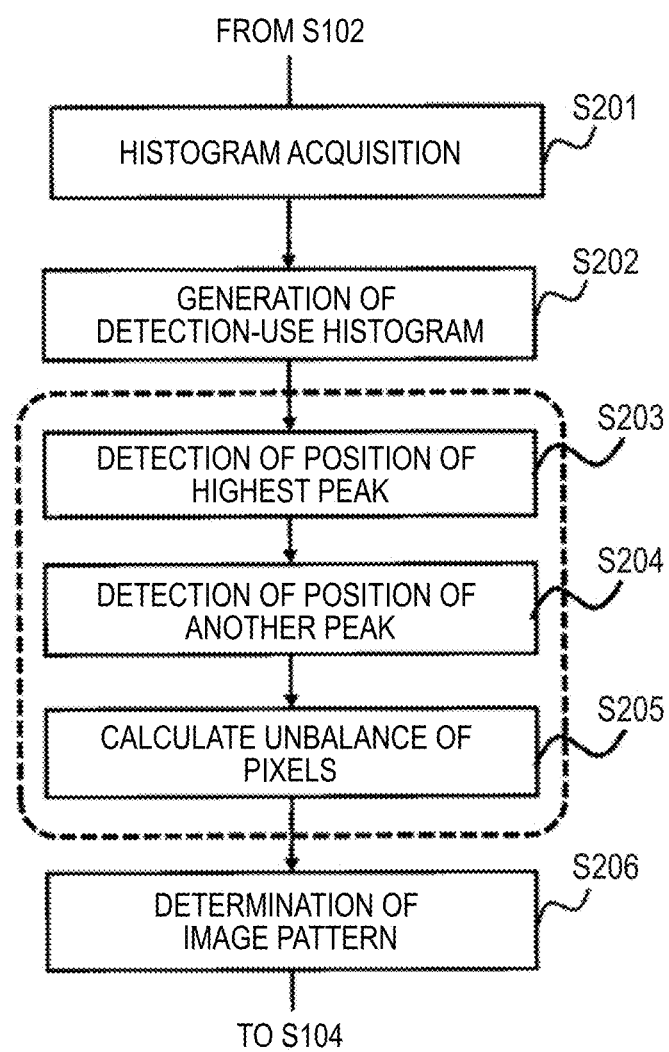
FIG. 13 is a flowchart illustrating details of an image pattern determination process in the first example embodiment.

Details of the image pattern determination process will be described with reference to a flowchart of FIG. 13.

The image pattern determination is performed by determining an image pattern based on a histogram of an image as described below.

[Preprocess for Detecting Feature of Image]

The histogram generation unit 12 acquires a histogram of an image (step 201) and, from the histogram of the image, generates a detection-use histogram (step S202).

Figure 14:
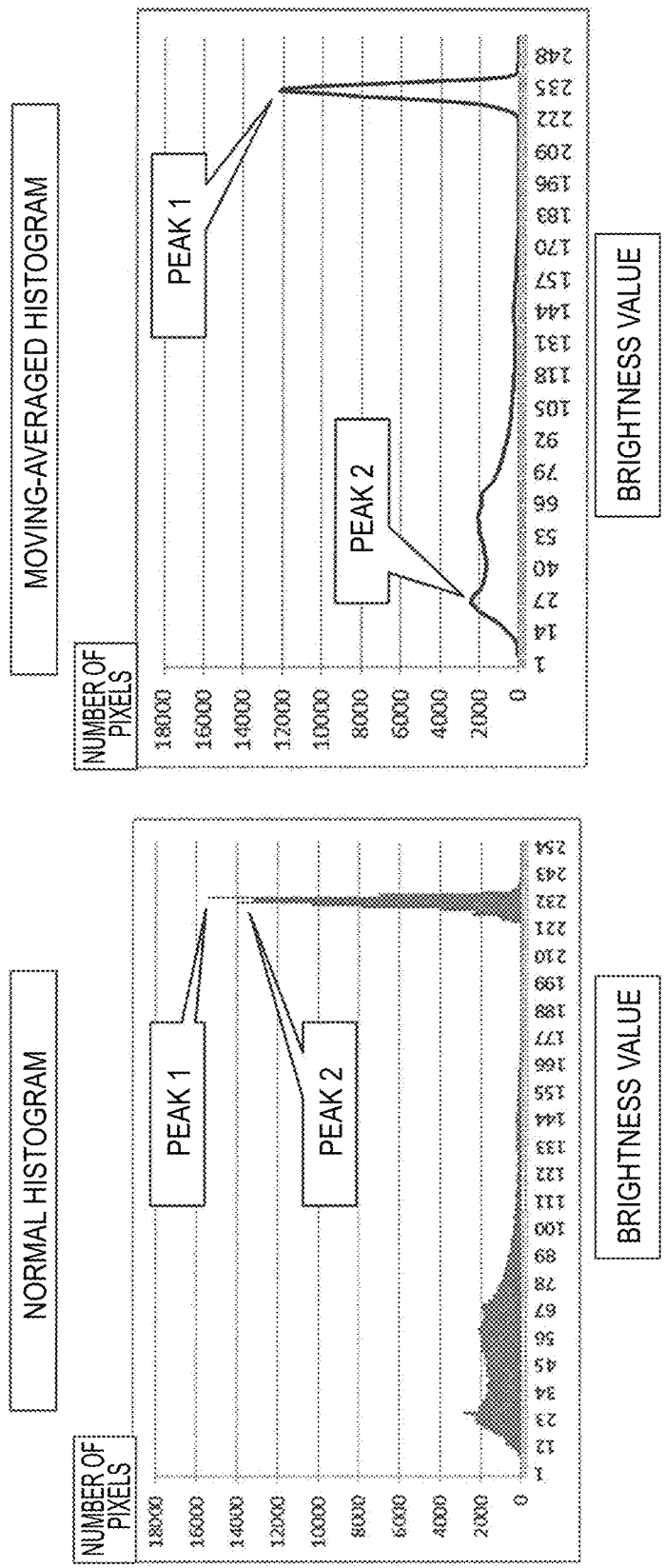
FIG. 14 is a diagram illustrating a normal histogram and a histogram in which fine unevenness is smoothed by using moving average.

The generation of a detection-use histogram is performed for detecting a peak of a histogram, and fine unevenness in the histogram is smoothed by using moving average as illustrated in FIG. 14. The graph on the right side in FIG. 14 represents a detection-use histogram by a polygonal line. This can reduce erroneous detection at the determination with a histogram to appropriately determine an image pattern. When peak detection is possible, however, a detection-use histogram is not necessarily generated by using moving average.

Figure 15:
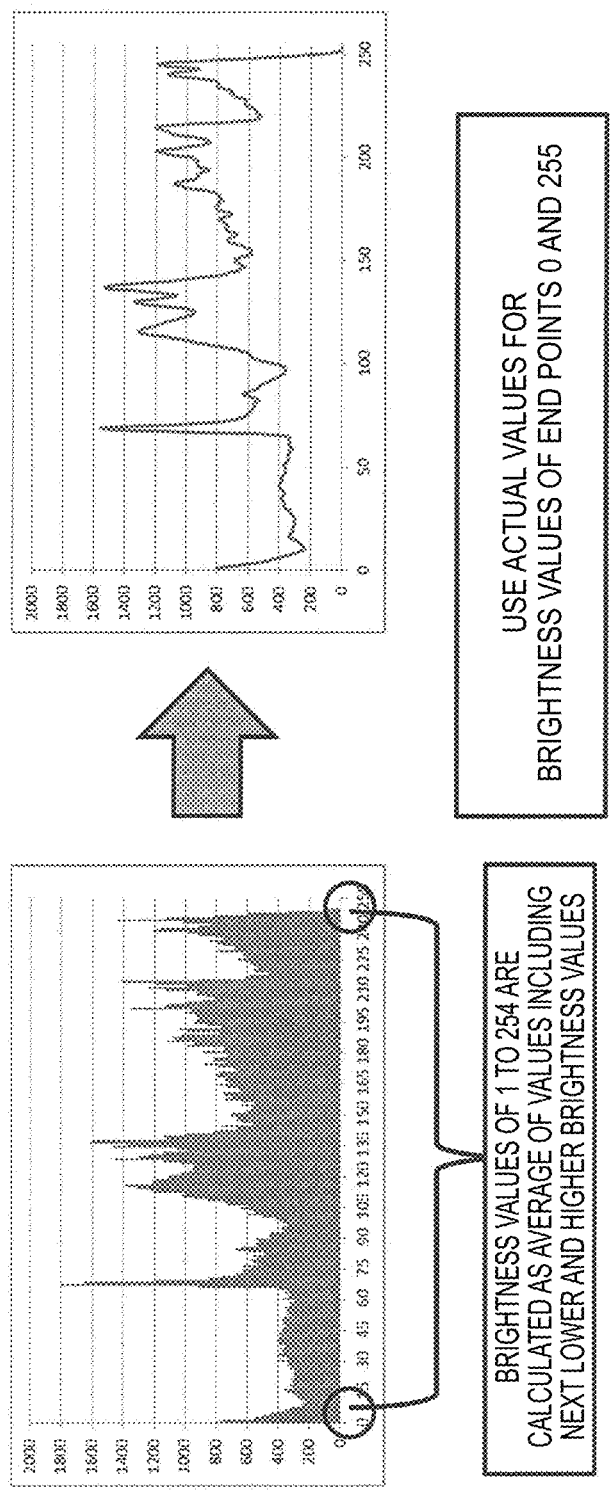
FIG. 15 is a diagram illustrating a histogram in which fine unevenness is smoothed by using moving average.

In moving average being performed, a graph is generated using averaged values of the number of pixels having a brightness value of a target brightness value and brightness values that are next lower than and next higher than the target brightness value. Further, for each number of pixels having the end brightness values of 0 and 255, the actual number of pixels is used without change. For each number of pixels having brightness values of 1 to 254, the average value is calculated by using the number of pixels having a next lower brightness value, an equal brightness value, and a next higher brightness value. For example, with respect to the number of pixels with a brightness value of 160, the average number of pixels having brightness values of 159, 160, and 161 is used. As illustrated in FIG. 15, by averaging a histogram, fine unevenness is smoothed to generate a detection-use histogram. The graph on the right side in FIG. 15 represents a detection-use histogram by a line graph.

[Detection of Feature of Image]

Figure 16:
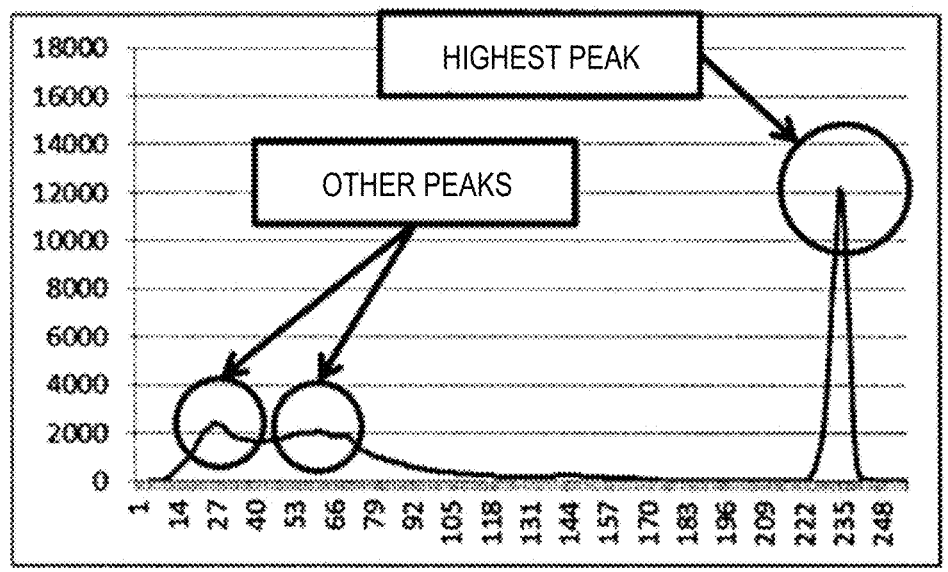
FIG. 16 is a diagram illustrating the highest peak and other peaks located in a detection-use histogram using moving average.

A feature of an image is detected from a detection-use histogram. The number of peaks (three points at the maximum) and the peak position thereof are detected, and the degree of unbalance of pixels is calculated to detect the feature of an image. Specifically, from the detection-use histogram, the highest peak (the highest rank peak) for the largest number of pixels and the position (brightness value) thereof are detected (step S203) and other peaks (two points at the maximum) and the positions (brightness values) thereof are detected (step S204) by the peak detection unit 131. The degree of unbalance of pixels are then calculated by the pixel unbalance detection unit 132 (step S205). FIG. 16 is a diagram illustrating an example in which the highest peak whose number of pixels is the largest is present and some peaks whose number of pixels is smaller than that of the highest peak are present. Note that expression "a peak is present at a brightness value (N (N is an integer))" means that the number of pixels at the brightness value (N) is larger than the number of pixels at the brightness value (N−1) and larger than the number of pixels at the brightness value (N+1). Further, expression "a peak is present at the brightness value 0" means a case where the number of pixels at the brightness value 0 is larger than the number of pixels at the brightness value 1, and expression "a peak is present at the brightness value 255" means a case where the number of pixels at the brightness value 255 is larger than the number of pixels at the brightness value 254.

The number of peaks and the peak position of an image is detected by steps S203 and S204, the degree of unbalance in the entire pixels is then calculated by step S205, and information of the entire concentration ratio is obtained from the calculated value. Note that step S205 may be performed at the same time as steps S203 and S204 or may be performed before steps S203 and S204.

The detection of peaks in a detection-use histogram is performed as below.

1. One having the largest number of pixels is determined as the highest peak (highest rank peak).

2. One having the largest number of pixels on the left side (the side of the brightness value 0) of the brightness value of the highest peak (highest rank peak) is a candidate of a peak, and similarly one having the largest number of pixels on the right side (the side of the brightness value 255) is another candidate of a peak.

3. The number of pixels of the candidate of the peak on the left side (the side of the brightness value 0) and the number of pixels of the highest peak (highest rank peak) are compared, and it is determined as "left-side peak" present on the left side (the side on the brightness value 0) of the brightness value of the highest peak (highest rank peak) if the number of pixels of the candidate of the peak on the left side (the side of the brightness value 0) is greater than or equal to one-tenth the number of pixels of the highest peak (highest rank peak) but not determined as a peak if the number is less than one-tenth. That is, when the number is less than one-tenth, no left-side peak is present.

4. The number of pixels of the candidate of the peak on the right side (the side of the brightness value 255) and the number of pixels of the highest peak (highest rank peak) are compared, and it is determined as "right-side peak" present on the right side (the side on the brightness value 255) of the brightness value of the highest peak (highest rank peak) if the number of pixels of the candidate of the peak on the right side (the side of the brightness value 255) is greater than or equal to one-tenth the number of pixels of the highest peak (highest rank peak) but not determined as a peak if the number is less than one-tenth. That is, when the number is less than one-tenth, no right-side peak is present.

Note that, when there are a plurality of ones having the largest number of pixels, one which is the closest to the brightness value 0 is defined as the highest peak (highest rank peak), and one which is the closest to the brightness value 255 is defined as the right-side peak except one whose brightness value is continuous from that of the highest peak (highest rank peak). One which is the closest to the brightness value 255 including one whose brightness value is continuous from that of the highest peak (highest rank value) may be defined as the right-side peak.

Further, when there are a plurality of ones that have the same number of pixels and thus may be a left-side peak, one which is the closest to the brightness value 0 including one having a continuous brightness value is defined as the left-side peak, and when there are a plurality of ones that have the same number of pixels and thus may be a right-side peak, one which is the closest to the brightness value 255 including one having a continuous brightness value is defined as the right-side peak.

An example of peak detection will be described with reference to FIG. 17A to FIG. 17C.

Figure 17A:
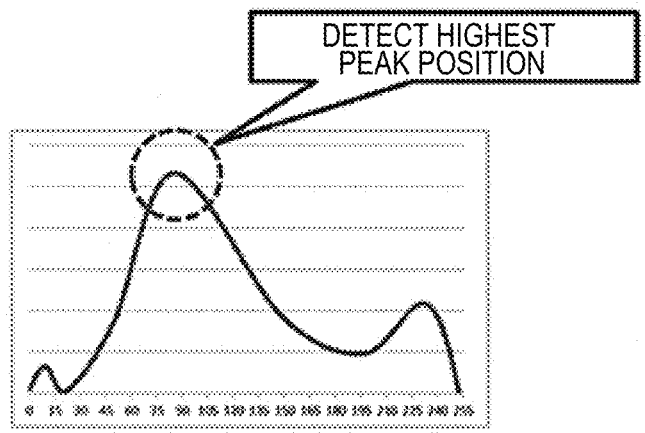
FIG. 17A is a first diagram illustrating a detection method for detecting the number of peaks and the positions thereof when one candidate peak is present both in the left and in the right of the highest peak in the first example embodiment.
Figure 17B:
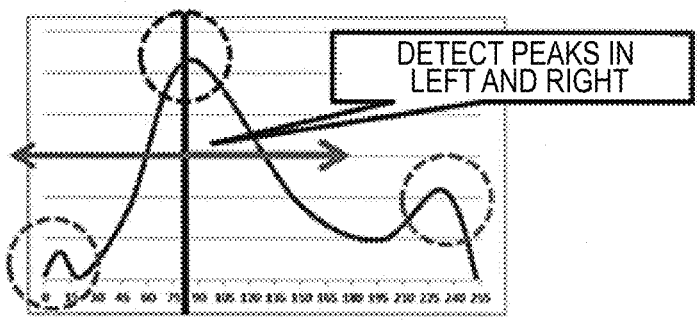
FIG. 17B is a second diagram illustrating a detection method for detecting the number of peaks and the positions thereof when one candidate peak is present both in the left and in the right of the highest peak in the first example embodiment.
Figure 17C:
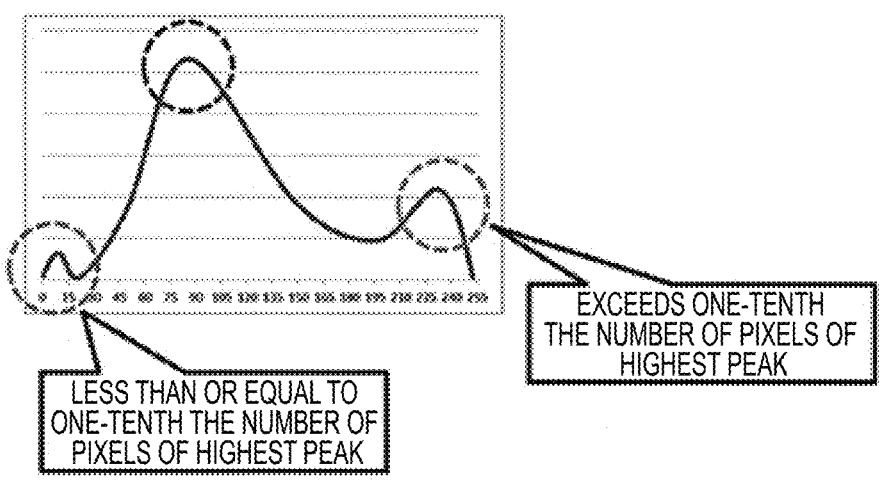
FIG. 17C is a third diagram illustrating a detection method for detecting the number of peaks and the positions thereof when one candidate peak is present both in the left and in the right of the highest peak in the first example embodiment.

First, as illustrated in FIG. 17A, the highest peak having the largest number of pixels and the position thereof are detected from a detection-use histogram, and as illustrated in FIG. 17B, two peaks which are located in the left and the right of the highest peak position, which are candidates, and the positions thereof are then detected. Whether or not a peak is determined in accordance with whether or not the number of pixels of the candidate peak is greater than or equal to one-tenth the number of pixels of the highest peak. As illustrated in FIG. 17C, the peak candidate on the right side in FIG. 17C is greater than or equal to one-tenth the number of pixels of the highest peak, it is determined as a right-side peak. On the other hand, the peak candidate on the left side in FIG. 17C is less than one-tenth the number of pixels of the highest peak, it is not determined as a left-side peak. In the example of FIG. 17A to FIG. 17C, the highest peak and the right-side peak are present, and no left-side peak is present.

[Determination of Image Patten]

Figure 18:
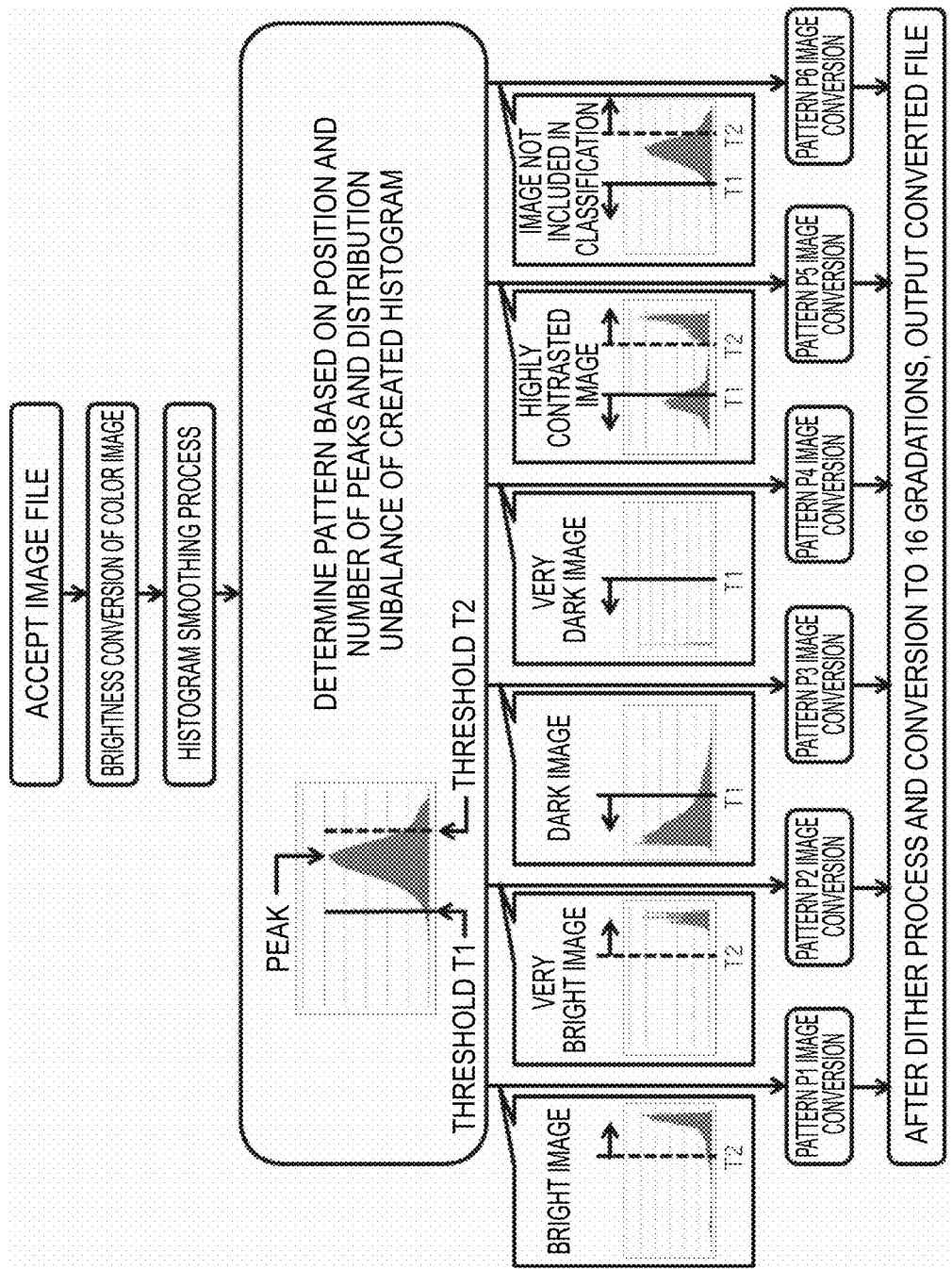
FIG. 18 is a diagram illustrating a process procedure when it is determined which of six image patterns an image is classified into, in the first example embodiment.

As illustrated in FIG. 18, based on the number of peaks and the peak position of an image and the degree of unbalance of the entire pixel, it is determined by the image pattern determination unit 133 which of the following six types of image patterns P1 to P6 an image pattern is classified into (step S103), and image data conversion predefined for every image pattern is performed by the image pattern-specific conversion processing unit 14 in accordance with the determined image pattern (step S104).

In the determination process of an image pattern performed by the image pattern determination unit 133 (step S206), first, a brightness value threshold T1 in the histogram is set to a brightness value 96 and a brightness value threshold T2 in the histogram is set to a brightness value 180, and it is determined in which of a range above the brightness value threshold T2 in the histogram or a range below the brightness value threshold T1 in the histogram the peak position of an image is present. Second, it is determined how many peaks are present in the range above the brightness value threshold T2 in a histogram. Third, it is determined whether the total number of pixels above the brightness value threshold T1 in the histogram is greater than or equal to 10% of the whole number of pixels or less than 10% of the whole number of pixels, and the degree of unbalance of the entire pixels is determined. From these determination results, it is determined which of the following six types of image patterns P1 to P6 an accepted image is classified into. That is, the accepted image is determined to be classified into which of the image patterns P1 to P6 based on the number of peaks, the peak positions, and the degree of unbalance of the entire pixels.

(1) Image Pattern P1 (Bright Image)

The image pattern P1 is a pattern of a bright image in which only the highest (highest rank) peak is present above the brightness value threshold T2 in the histogram and no peak is present below the brightness value threshold T1 in the histogram.

(2) Image Pattern P2 (Very Bright Image)

The image pattern P2 is a pattern of a very bright image in which the highest (highest rank) peak and the left-side peak, the highest (highest rank) peak and the right-side peak, or the highest (highest rank) peak, the left-side peak, and the right-side peak are present above the brightness value threshold T2 in the histogram and no peak is present below the brightness value threshold T1 in the histogram.

(3) Image Pattern P3 (Dark Image)

The image pattern P3 is a pattern of a dark image in which the highest (highest rank) peak is present below the brightness value threshold T1 in the histogram, the total number of pixels above the threshold T1 is greater than or equal to 10% of the whole number of pixels, and no peak is present above the brightness value threshold T2 in the histogram.

(4) Image Pattern P4 (Very Darker Image)

The image pattern P4 is a pattern of a very dark image in which the highest (highest rank) peak is present below the brightness value threshold T1 in the histogram, the total number of pixels above the threshold T1 is less than 10% of the whole number of pixels, and no peak is present above the brightness value threshold T2 in the histogram.

(5) Image Pattern P5 (Highly Contrasted Image)

The image pattern P5 is a pattern of a highly contrasted image in which the highest (highest rank) peak is present in one of the range below the brightness value threshold T1 in the histogram and the range above the brightness value threshold T2 in the histogram and another peak is present in the other.

(6) Image Pattern P6 (image not included in image patterns P1 to P5)

The image pattern P5 is a pattern of an image not included in any image pattern of the image patterns P1 to P5.

An example of the specific image pattern determination process will be described below.

(A) First, it is detected whether or not the highest (highest rank) peak is present below the brightness value threshold T1 or above the brightness value threshold T2 in the detection-use histogram.

When the highest (highest rank) peak is present in one of the range below the brightness value threshold T1 and the range above the brightness value threshold T2 and another peak is present in the other, the image pattern P5 is determined.

(B) When the highest (highest rank) peak is present in one of the range below the brightness value threshold T1 and the range above the brightness value threshold T2 and no other peak is present in the other, the following process is performed according to in which of the range below the brightness value threshold T1 or the range above the brightness value threshold T2 the highest (highest rank) peak is present.

(B-1) When the highest (highest rank) peak is present above the threshold T2, it is further detected whether or not one or more peaks other than the highest peak are present above the threshold T2.

The image pattern P1 is determined when only the highest (highest rank) peak is present, and the image pattern P2 is determined when the highest (highest rank) peak and another peak are present.

(B-2) When the highest (highest rank) peak is present below the threshold T1, it is further detected whether or not the total number of pixels above the threshold T1 is greater than or equal to 10% of the whole number of pixels.

The image pattern P3 is determined when the total number of pixels above the threshold T1 is greater than or equal to 10% of the whole number of pixels, and the image pattern P4 is determined when the total number of pixels above the threshold T1 is less than 10% of the whole number of pixels.

(C) The image pattern P6 is determined when none of the image patterns P1 to P5 is determined.

Note that, while image patterns are classified into the six image patterns of the image patterns P1 to P6 described above in the present example embodiment, the image pattern may be classified into seven or more image patterns with another added condition or may be classified into five or less image patterns with changed conditions. For example, the second example embodiment described later illustrates an example in which image patterns are classified into seven image patterns with an added image pattern PA7 of a white image. Further, the third example embodiment illustrates an example in which the image pattern P1 (bright image) and the image pattern P2 (very bright image) are combined to be an image pattern PB1 (bright image), and the image pattern P3 (dark image), and the image pattern P4 (very dark image) are combined to be an image pattern PB3 (dark image), and thereby image patterns are classified into four patterns.

Next, the image pattern-specific conversion process will be described.

The image pattern-specific conversion process is a process of performing correction predefined for every image pattern on image data.

(A) Details of Process for Image Pattern P1 and Image Pattern P2

With an image of the image pattern P1 and the image pattern P2, attempt to enhance the contrast by histogram expansion often causes a darkened result. Further, when gamma correction is applied to obtain the same effect, the entire image is darkened.

Figure 19:
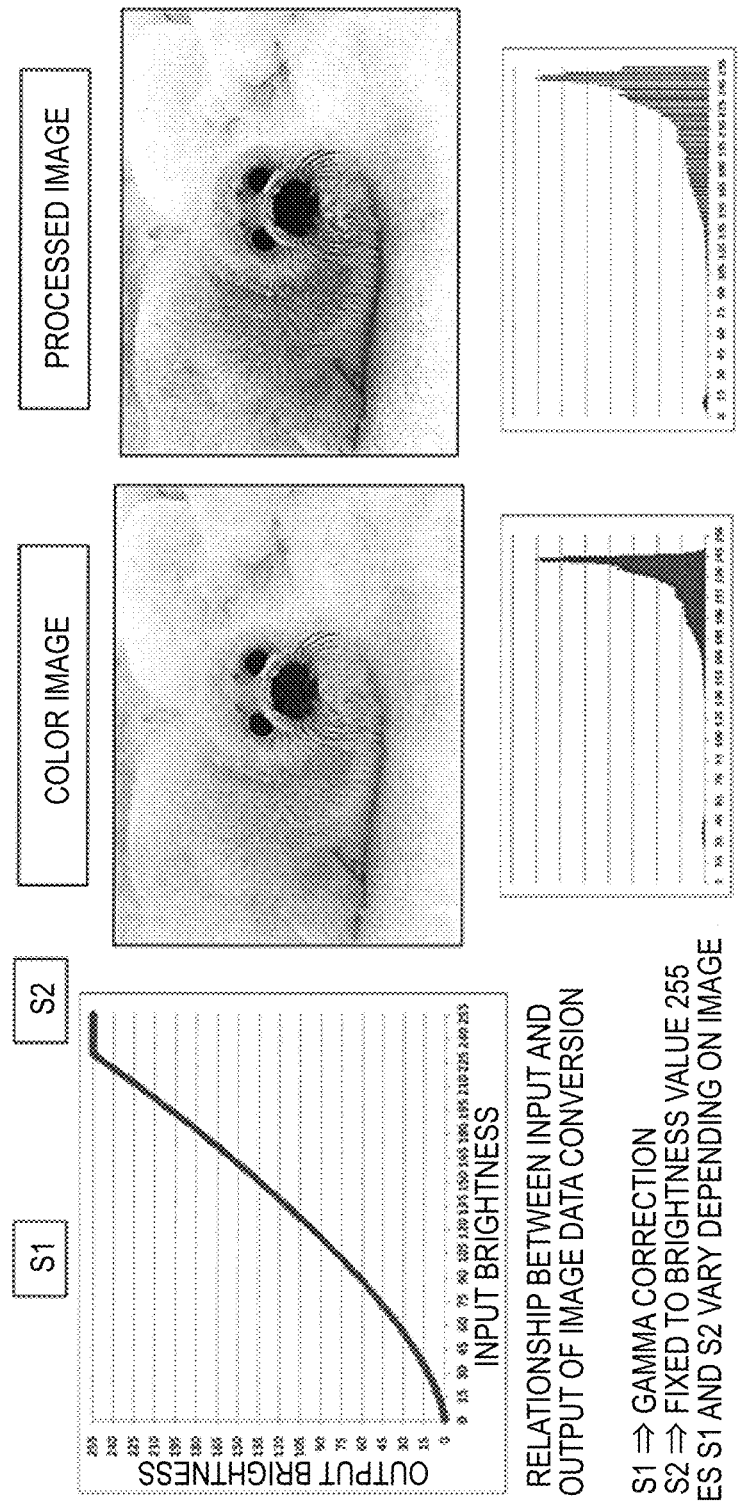
FIG. 19 is a diagram illustrating details of processes for an image pattern P1 and an image pattern P2 in the first example embodiment.

In the image data conversion device of the present example embodiment, in order to solve the problem described above, gamma correction is performed for the brightness value in a predetermined range S1 from the brightness value 0, and the brightness value is fixed to 255 for the brightness value in a predetermined range S2 from the brightness value 255, as illustrated in FIG. 19. By doing so, it is possible to provide a black-side contrast while maintaining the contrast of white. The image data conversion process for the image pattern P1 is performed by the first image data conversion unit 141, and the image data conversion process for the image pattern P2 is performed by the second image data conversion unit 142.

A difference in the details of the process between the image pattern P1 and the image pattern P2 is in that the ranges S1 and S2 described above are different from each other. The ranges S1 and S2 vary depending on images. The images and histograms in FIG. 19 relate to a color image and an image obtained after image processing with the image pattern P1.

Figure 20:
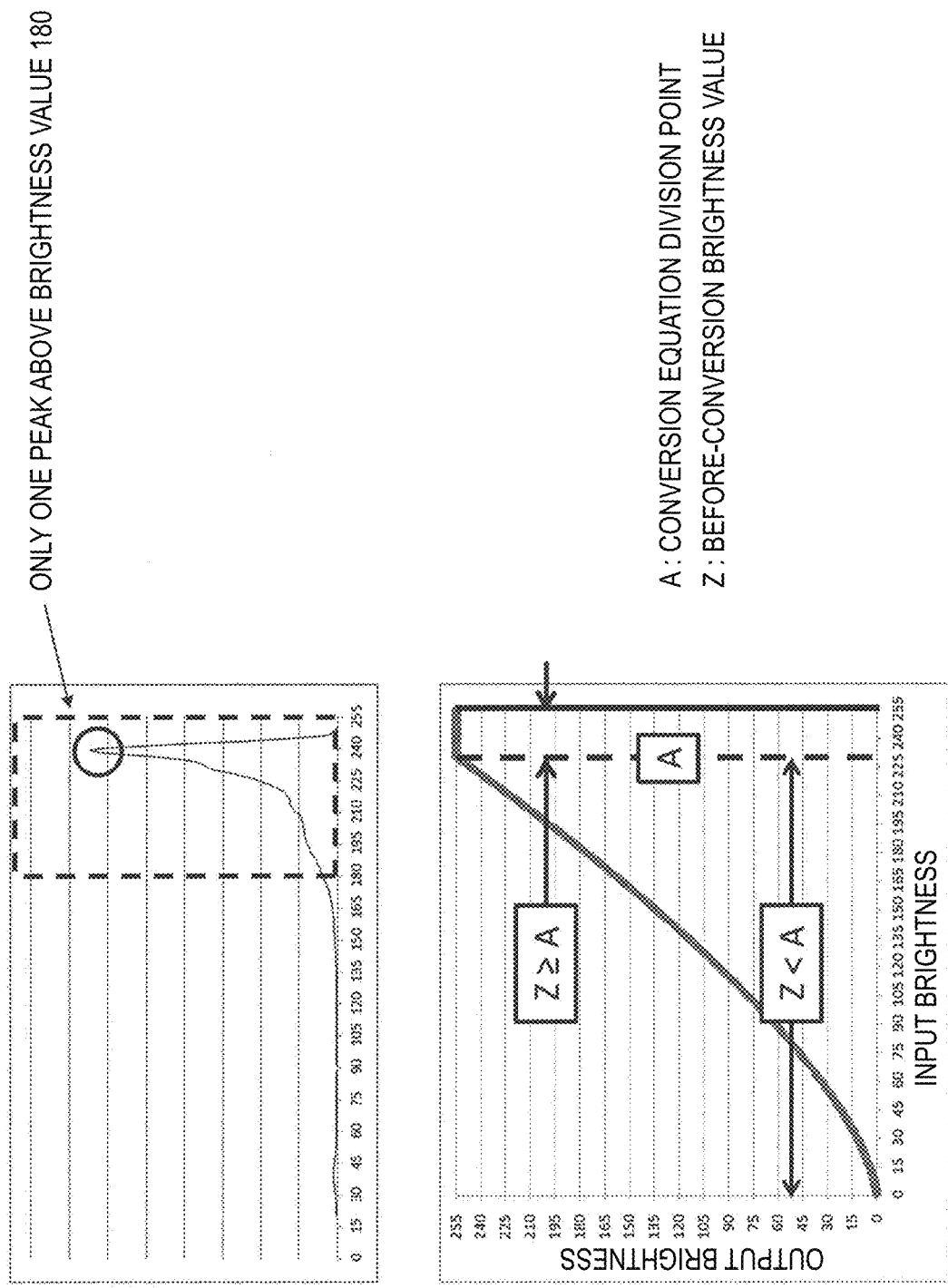
FIG. 20 is a diagram further illustrating details of the process for the image pattern P1 in the first example embodiment.

As illustrated in FIG. 20, the image pattern P1 is an image having only one peak above the brightness value 180 in the histogram (threshold T2=180), and the before-conversion brightness value Z is converted to the after-conversion brightness value Z' by an image data conversion equation Math. 2 (equation 2). The brightness value A indicating a division point of the conversion equation is a brightness value of 3% on the white side of the whole number of pixels, which is a brightness value at which the number of pixels is added from the brightness value 255 and reaches 3% of the whole number of pixels. The range S1 and the range S2 described above are determined by the brightness value A. A conversion correction coefficient Ac of the conversion equation is derived by Ac=(the total number of pixels of the brightness values 180 to 255)/(the whole number of pixels). Note that, in order to suppress excessive correction, when the value of Ac is less than 0.4, Ac is corrected to 0.5.

$$Z' = 255 \times \left(\frac{Z}{A}\right)^{\frac{1}{Ac}} (Z < A)$$
$$Z' = 255 \ (Z \geq A)$$
[Math. 2]

Figure 21:
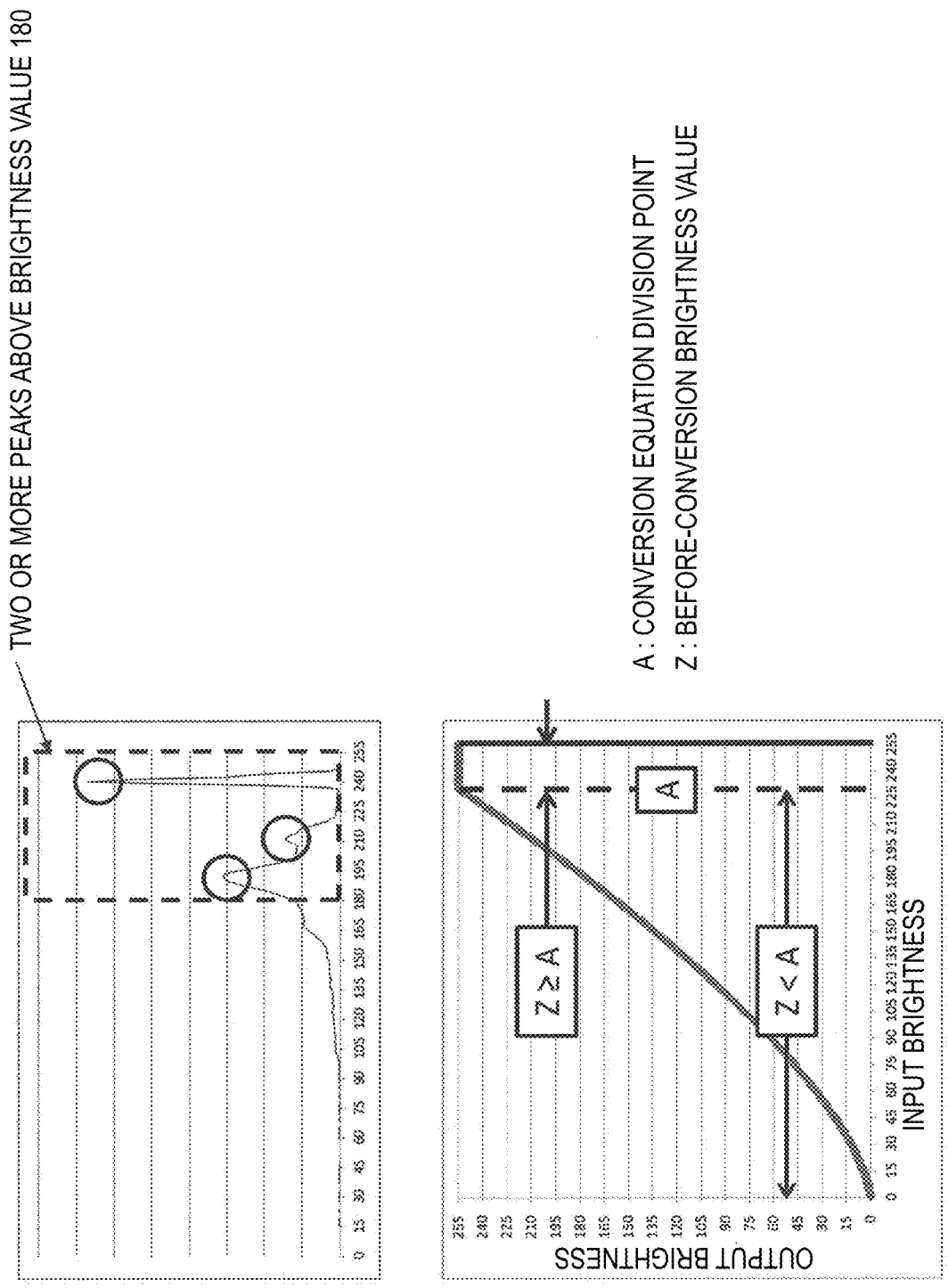
FIG. 21 is a diagram further illustrating details of the process for the image pattern P2 in the first example embodiment.

As illustrated in FIG. 21, the image pattern P2 is an image when two or more peaks are present above the brightness value 180 in the histogram (threshold T2=180), and the before-conversion brightness value Z is converted to the after-conversion brightness value Z' by the image data conversion equation Math. 2 (equation 2) described above. The conversion of the brightness value of the image pattern P2 is different from the conversion of the brightness value of the image pattern P1 in that the brightness value A indicating the division point of the conversion equation is a brightness value of 1% on the white side of the whole number of pixels, which is a brightness value at which the number of pixels is added from the brightness value 255 and reaches 1% of the whole number of pixels.

(B) Details of Process for Image Pattern P3 and Image Pattern P4

With an image of the image pattern P3 and the image pattern P4, attempt to enhance the contrast by histogram expansion often results in blown out highlights. Further, when gamma correction is applied to obtain the same effect, the entire image is whitened.

Figure 22:
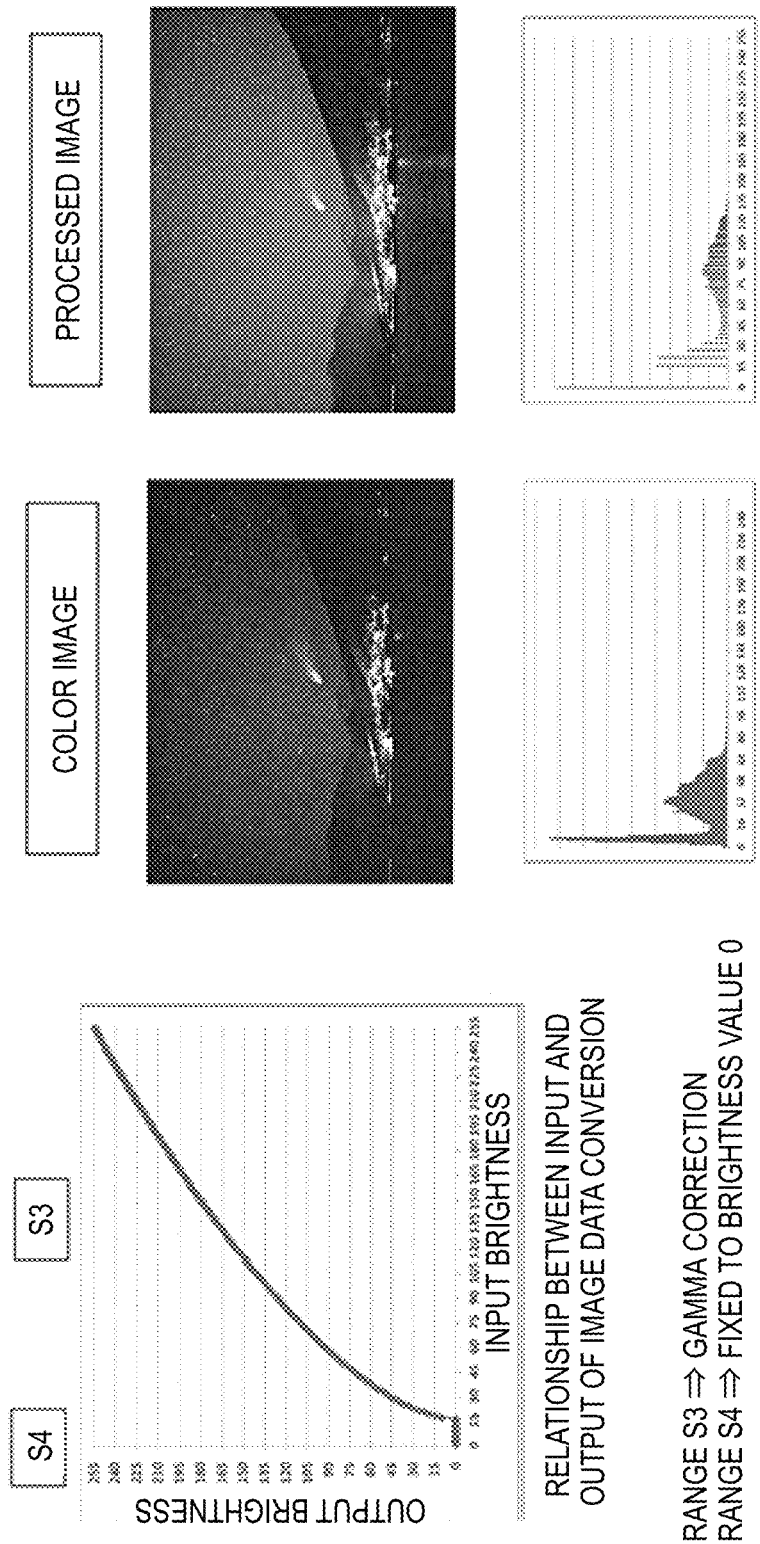
FIG. 22 is a diagram illustrating details of processes for an image pattern P3 and an image pattern P4 in the first example embodiment.

In the image data conversion device of the present example embodiment, in order to solve the problem described above, gamma correction is performed for the brightness value in a predetermined range S3 from the brightness value 255, and the brightness value is fixed to 0 for the brightness value in a predetermined range S4 from the brightness value 0, as illustrated in FIG. 22. By doing so, it is possible to widen the representation on the white side while maintaining the contrast of black. The image data conversion process for the image pattern P3 is performed by the third image data conversion unit 143, and the image data conversion process for the image pattern P4 is performed by the fourth image data conversion unit 144.

A difference in the details of the process for an image between the image pattern P3 and the image pattern P4 is in that the ranges S3 and S4 described above are different from each other. The ranges S3 and S4 vary depending on images. The images and histograms in FIG. 22 relate to a color image and an image obtained after image processing with the image pattern P4.

Figure 23:
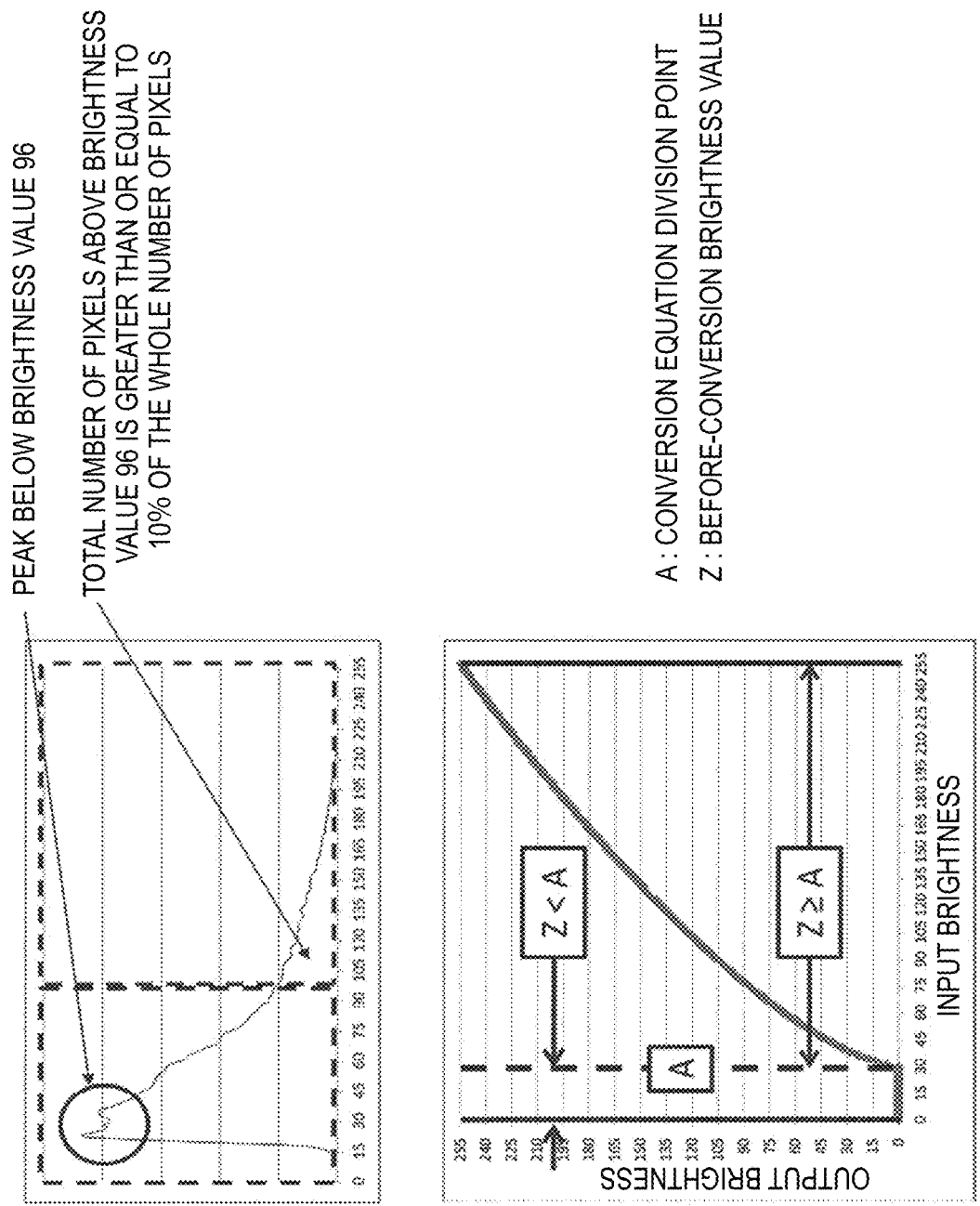
FIG. 23 is a diagram further illustrating details of the process for the image pattern P3 in the first example embodiment.

As illustrated in FIG. 23, the image pattern P3 is an image when a peak is present below the brightness value 96 in the histogram (threshold T1=96) and the total number of pixels above the brightness value 96 is greater than or equal to 10% of the whole number of pixels, and the before-conversion brightness value Z is converted to the after-conversion brightness value Z' by an image data conversion equation Math. 3 (equation 3). The brightness value A indicating a division point of the conversion equation is a brightness value of 5% on the black side of the whole number of pixels, which is a brightness value at which the number of pixels is added from the brightness value 0 and reaches 5% of the whole number of pixels. The range S3 and the range S4 described above are determined by the brightness value A. A conversion correction coefficient Ac of the conversion equation is derived by Ac=1+(the total number of pixels of the brightness values 96 to 255)/(the whole number of pixels). Note that, in order to suppress excessive correction, when the value of Ac exceeds 1.5, Ac is corrected to 1.4.

$$Z' = 0 \ (Z < A)$$
$$Z' = 255 \times \left(\frac{(Z-A)}{(255-A)}\right)^{\frac{1}{Ac}} (Z \geq A)$$
[Math. 3]

Figure 24:
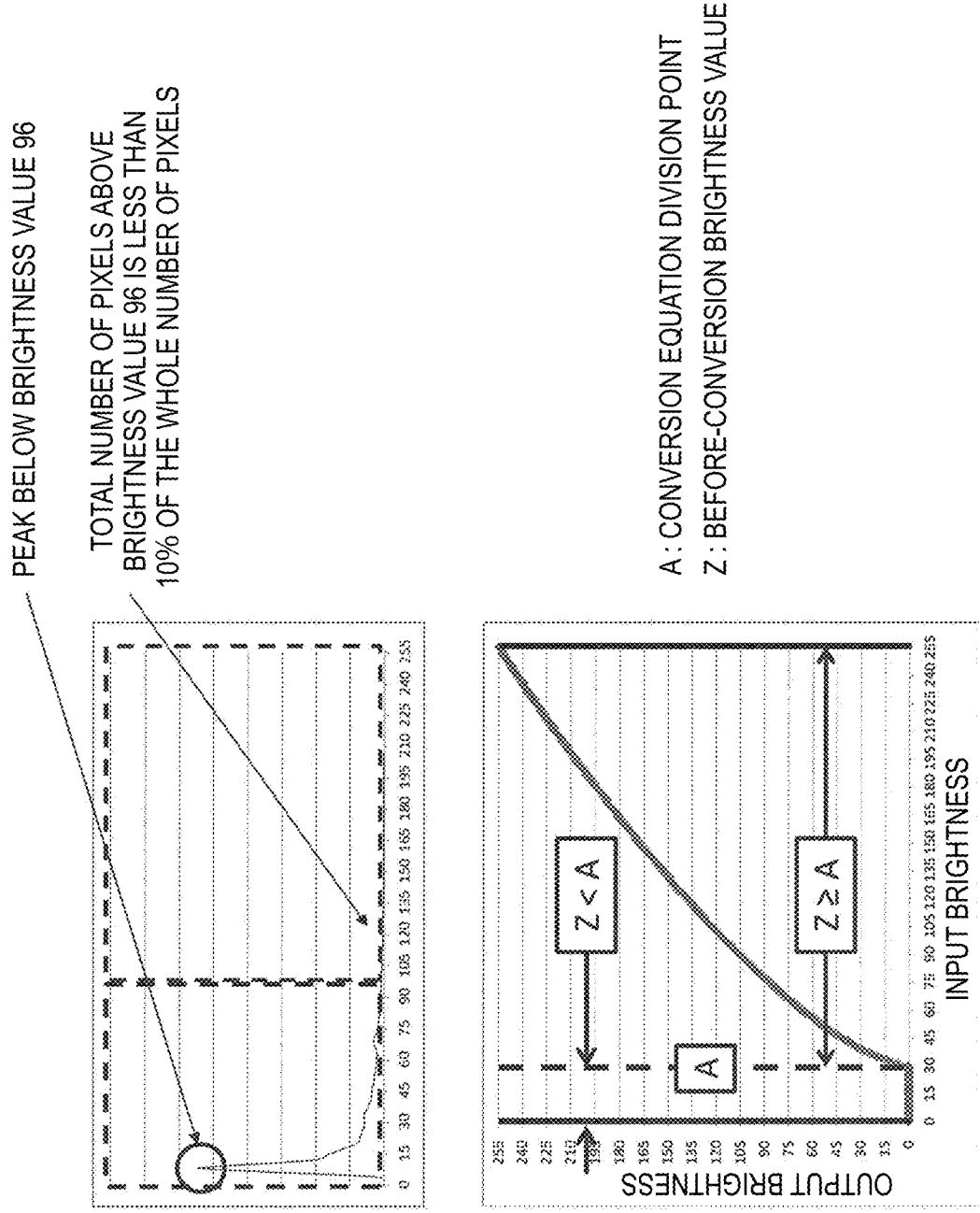
FIG. 24 is a diagram further illustrating details of the process for the image pattern P4 in the first example embodiment.

As illustrated in FIG. 24, the image pattern P4 is an image when a peak is present below the brightness value 96 in the histogram (threshold T1=96) and the total number of pixels above the brightness value 96 is less than 10% of the whole number of pixels, and the before-conversion brightness value Z is converted to the after-conversion brightness value Z' by the image data conversion equation Math. 3 (equation 3). The conversion of the brightness value of the image pattern P4 is different from the conversion of the brightness value of the image pattern P3 in that the value A indicating the division point of the conversion equation is a brightness value of 3% on the black side of the whole number of pixels, which is a brightness value at which the number of pixels is added from the brightness value 0 and reaches 3% of the whole number of pixels.

(C) Details of Process for Image Pattern P5

Since an image of the image pattern P5 is a highly contrasted image, attempt to enhance the contrast by the histogram expansion often results in notable blocked up shadows.

Figure 25:
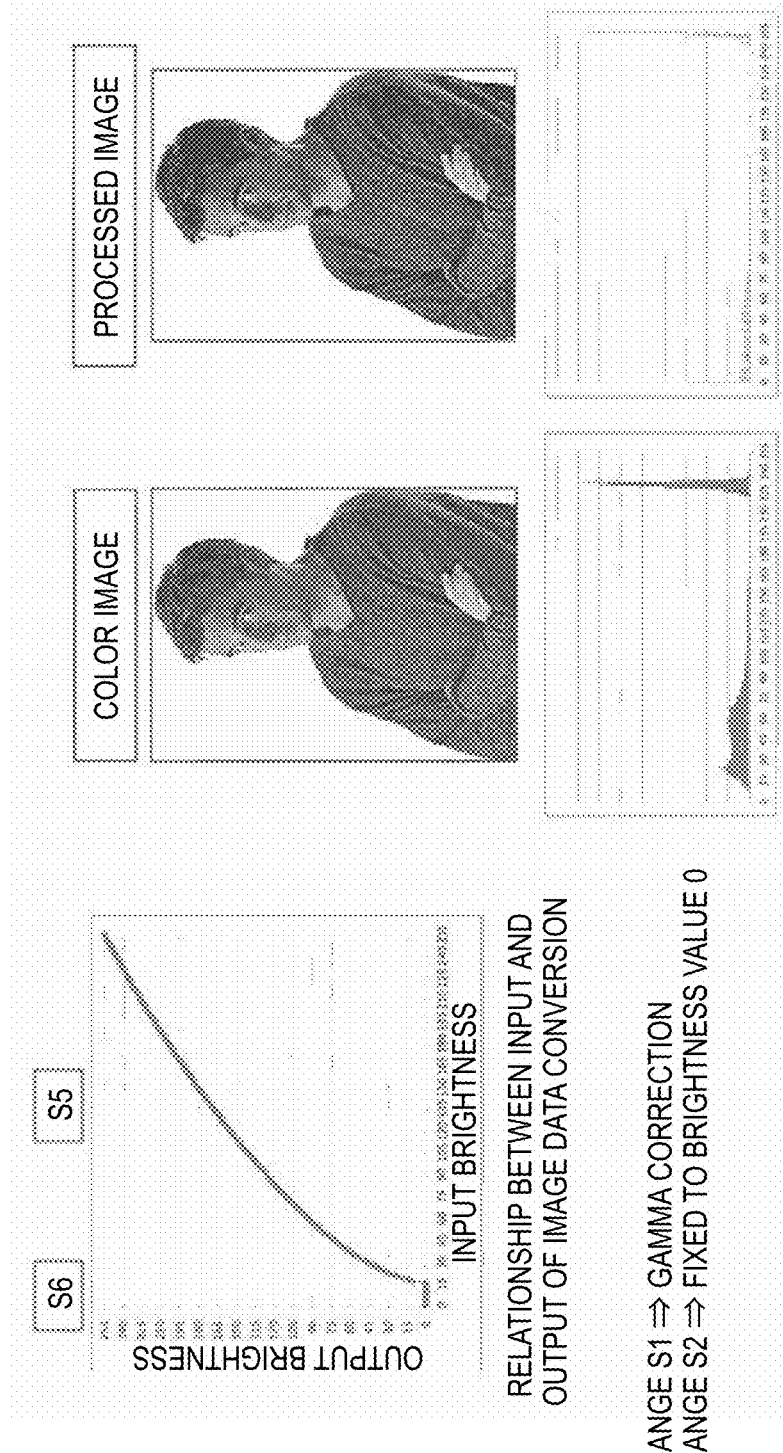
FIG. 25 is a diagram illustrating details of a process for an image pattern P5 in the first example embodiment.

In the image data conversion device of the present example embodiment, in order to solve the problem described above, gamma correction (moderate correction) is performed for the brightness value in a predetermined range S5 from the brightness value 255, and the brightness value is fixed to 0 for the brightness value in a predetermined range S6 from the brightness value 0, as illustrated in FIG. 25. By doing so, it is possible to widen the representation of colors while maintaining the contrast of black. The ranges S5 and S6 vary depending on images. The image data conversion process for the image pattern P5 is performed by the fifth image data conversion unit 145. The images and the histogram of FIG. 25 relate to a color image and an image after the image data conversion process for the image pattern P5.

Figure 26:
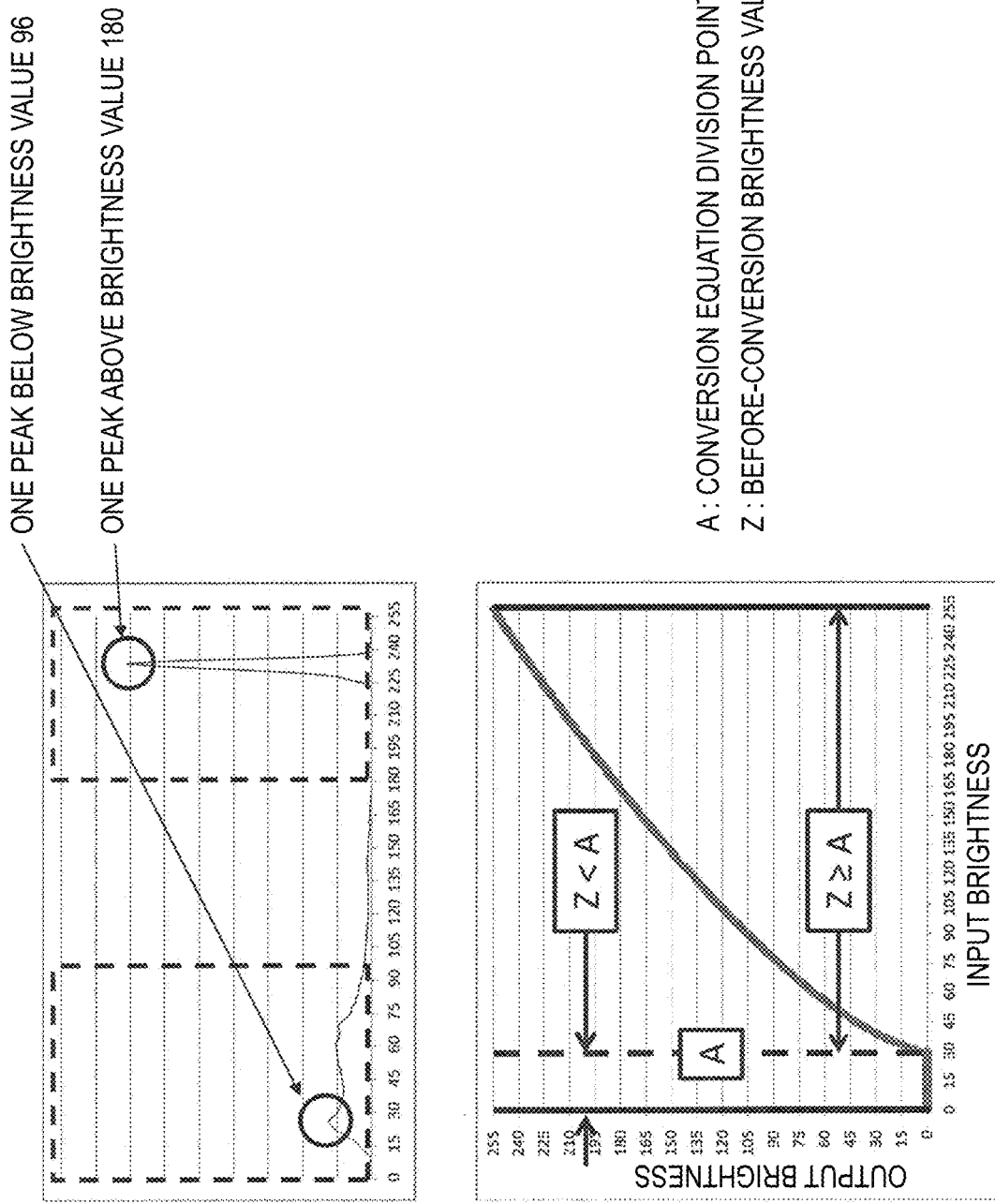
FIG. 26 is a diagram further illustrating details of the process for the image pattern P5 in the first example embodiment.

As illustrated in FIG. 26, the image pattern P5 is an image when a peak is present below the brightness value 96 in the histogram (threshold T1=96) and a peak is present above the brightness value 180 in the histogram (threshold T2=180), the before-conversion brightness value Z is converted to the after-conversion brightness value Z' by an image data conversion equation Math. 3 (equation 3) in the same manner as the case of the image pattern P4. The value A indicating the division point of the conversion equation is determined in in the same manner as the case of the image pattern P4, and the range S5 and the range S6 described above are determined by this value A. The conversion correction coefficient Ac of the conversion equation is also derived in in the same manner as the case of the image pattern P4, and in order to suppress excessive correction, when the value of Ac exceeds 1.5, Ac is corrected to 1.4.

(D) Details of Process for Image Pattern P6

The image pattern P6 is an image not included in the image patterns P1 to P5, and the following process is performed.

Figure 27:
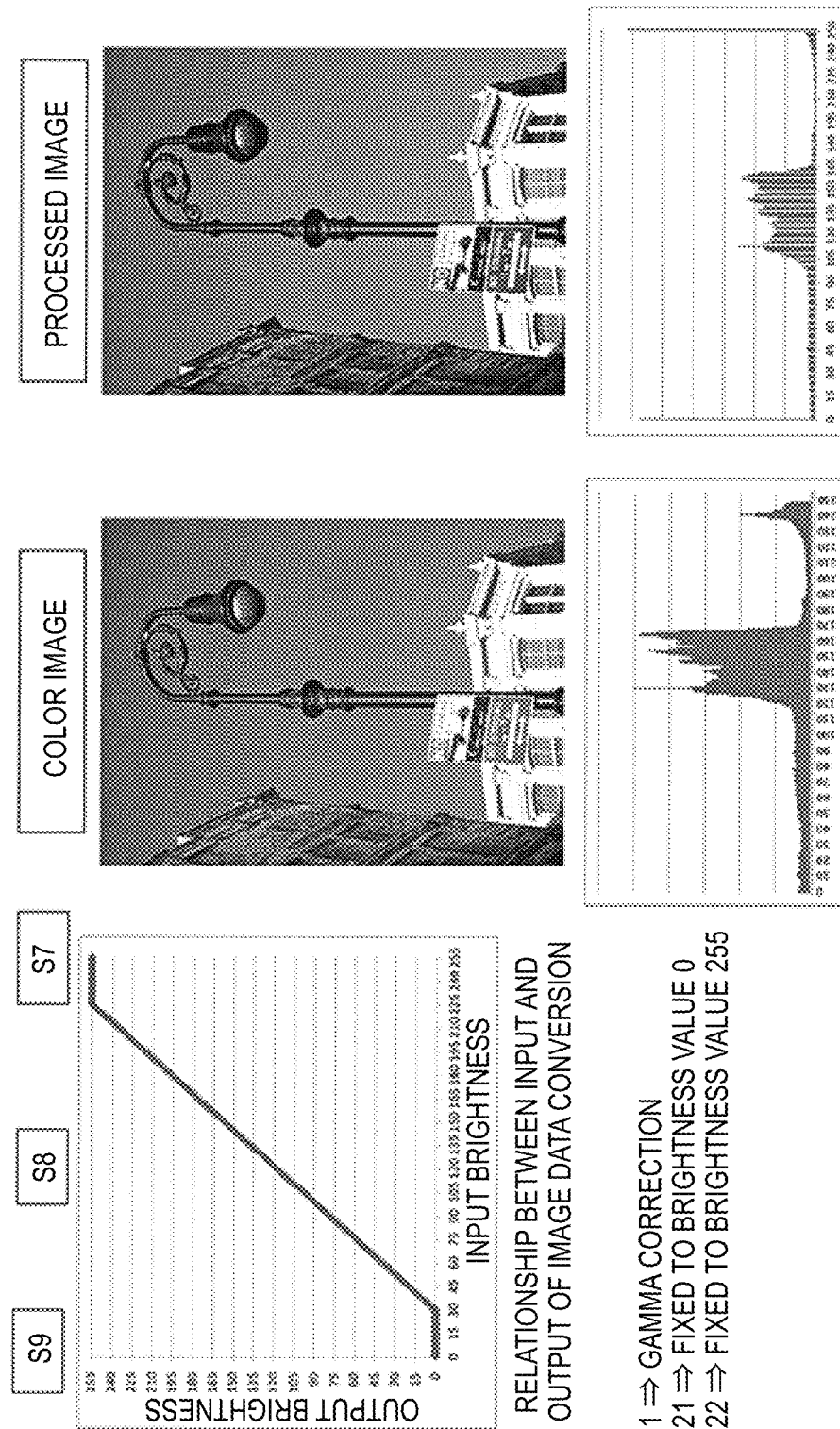
FIG. 27 is a diagram illustrating details of a process for an image pattern P6 in the first example embodiment.

In the image data conversion device of the present example embodiment, as illustrated in FIG. 27, the brightness value is fixed to 255 for the brightness value in a predetermined range S7 from the brightness value 255, the brightness value is fixed to 0 for the brightness value in a predetermined range S9 from the brightness value 0, and gamma correction (Ac=1) is performed for a range S8 between the predetermined ranges S7 and S9. The ranges S7, S8, and S9 vary depending on images. The image data conversion process for the image pattern P6 is performed by the sixth image data conversion unit 146. The images and the histogram of FIG. 27 relate to a color image and an image after the image data conversion process for the image pattern P6.

Figure 28:
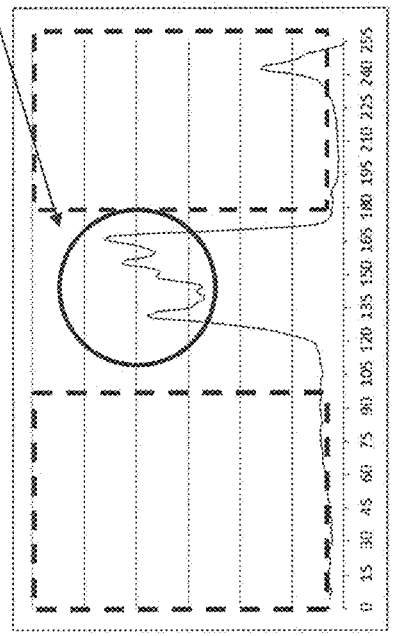
FIG. 28 is a diagram further illustrating details of a process for the image pattern P6 in the first example embodiment.
Figure 28:
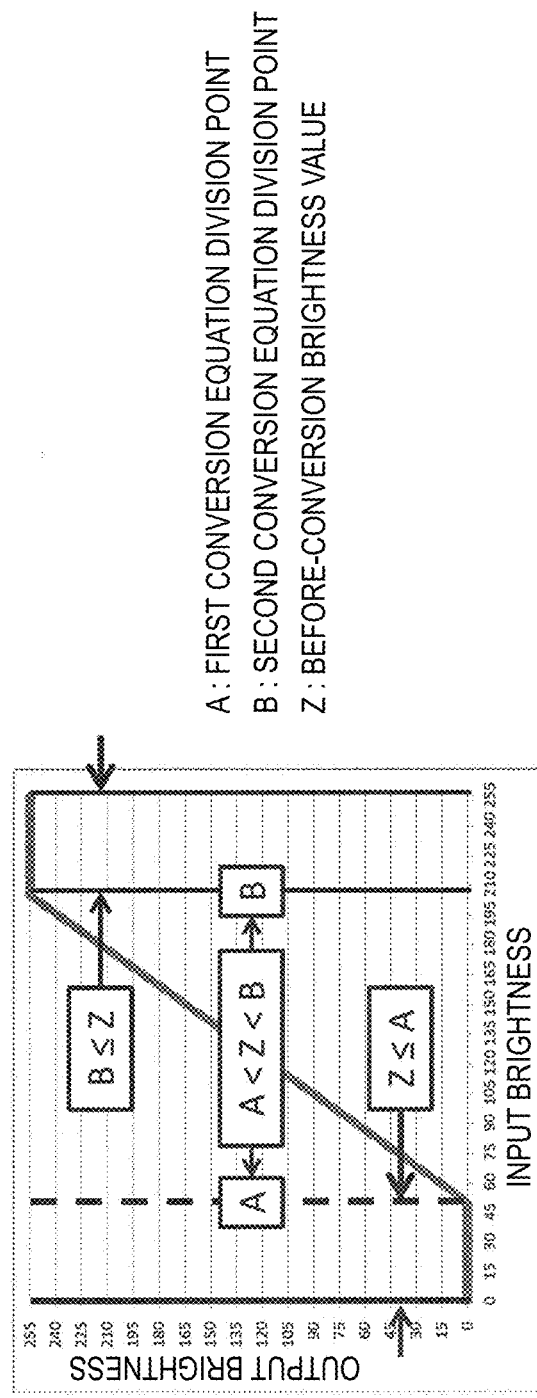

As illustrated in FIG. 28, the image pattern P6 is an image not included in the image patterns P1 to P5, and the before-conversion brightness value Z is converted to the after-conversion brightness value Z' by an image data conversion equation Math. 4 (equation 4). The value A indicating a first division point of the conversion equation is a brightness value of 5% on the black side of the whole number of pixels, which is a brightness value at which the number of pixels is added from the brightness value 0 and reaches 5% of the whole number of pixels. The value B indicating a second division point of the conversion equation is a brightness value of 5% on the white side of the whole number of pixels, which is a brightness value at which the number of pixels is added from the brightness value 255 and reaches 5% of the whole number of pixels. The range S7, the range S8, and the range S9 described above are determined by these values A and B.

$$Z' = 0 \ (Z \le A)$$
$$Z' = 255 \times \left(\frac{(Z-A)}{(B-A)}\right) (A < Z < B)$$
$$Z' = 255 \ (B \le Z)$$

[Math. 4]

[Second Example Embodiment]

Figure 29:
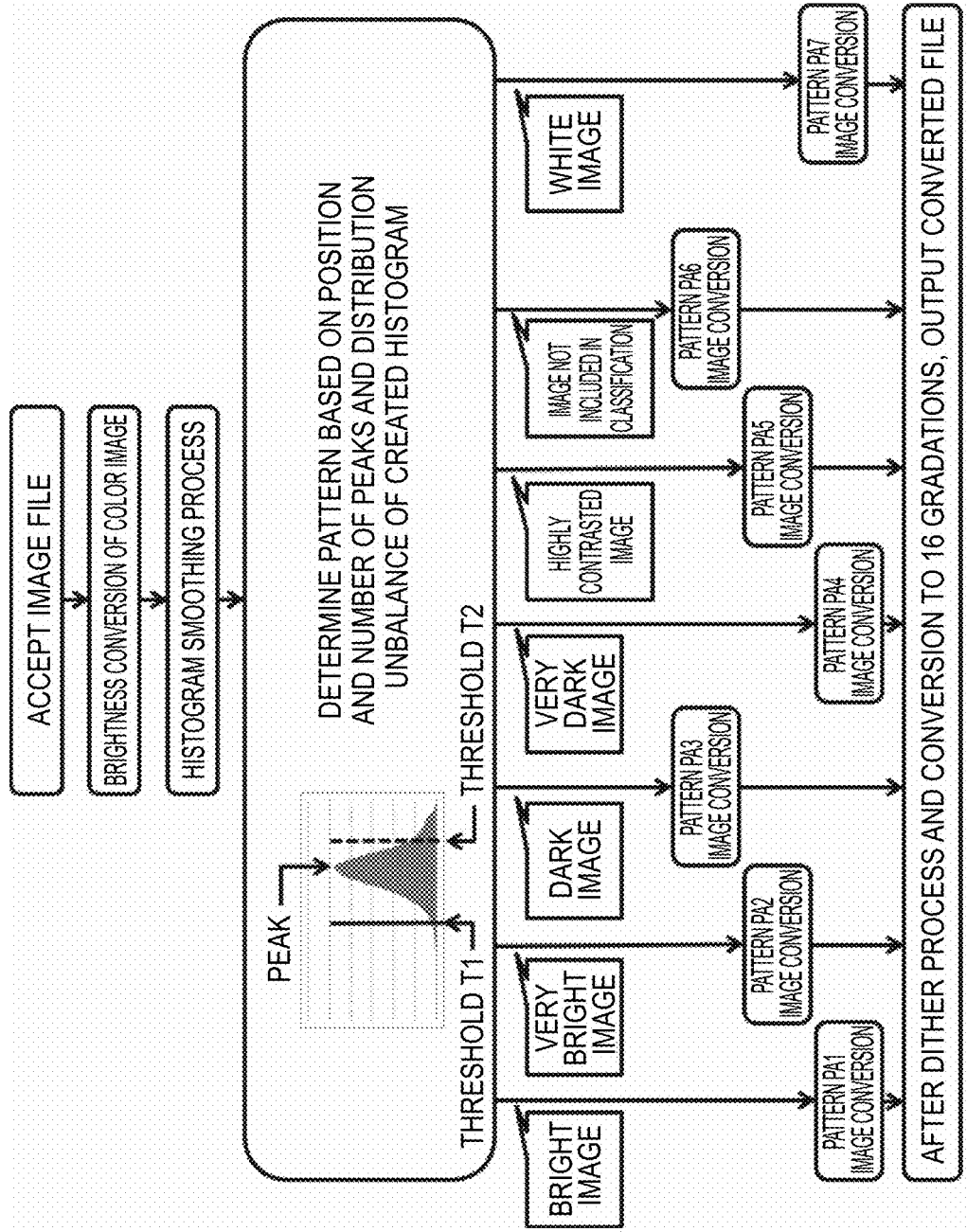
FIG. 29 is a diagram illustrating a process procedure when it is determined which of seven image patterns an image is classified into in a second example embodiment of the present invention.

A second example embodiment will be described. In the present example embodiment, as described in FIG. 29, it is determined which of the seven types of image patterns PA1 to PA7 an accepted image is classified into, and an image pattern-specific conversion process is performed. The image pattern PA7 is a white image pattern, and a white image means an image having a large white portion as a whole. The image patterns classified into the image patterns P1 and P2 in the first example embodiment are classified into the image pattern PA1, PA2, or PA7.

While the configuration of the image data conversion device of the present example embodiment is the same as the configuration of the image data conversion device illustrated in FIG. 9, the image pattern-specific conversion processing unit 14 illustrated in FIG. 10 is different in that the seventh image data conversion unit that performs image data conversion process for the image pattern PA7 is added. The image data conversion process for the image patterns PA1 to PA6 are performed by the first image data conversion unit 141 to the sixth image data conversion unit 146 of FIG. 10, respectively, and image data conversion process for the image pattern PA7 is performed by the added seventh image data conversion unit.

In the present example embodiment, first, the determination process of the image pattern (step S206 of FIG. 13) sets the brightness value to 96 as the brightness value threshold T1 in the histogram and the brightness value to 180 as the threshold T2 and determines whether the highest (highest rank) peak of an image is present in the range above the brightness value threshold T2 in the histogram or present in the range below the brightness value threshold T1 in the histogram. Second, it is determined whether or not there is a peak other than the highest (highest rank) peak in the range above the brightness value threshold T2 in the histogram. Third, it is determined whether the total number of pixels above the brightness value threshold T1 in the histogram is greater than or equal to 10% of the whole number of pixels or less than 10% of the whole number of pixels to determine the degree of unbalance of the entire pixels. Fourth, it is determined whether the total number of pixels above the brightness value threshold T2 in the histogram is greater than or equal to 15% of the whole number of pixels or is less than 15% of the whole number of pixels to determine the degree of unbalance of the entire pixels. From the determination results of the above, it is determined which of the seven types of the image patterns PA1 to PA7 the accepted image is classified into. That is, based on the number of peaks and the peak position and the degree of unbalance of the entire image, it is determined which of the image patterns PA1 to PA7 the accepted image is classified into.

Since the image patterns PA3 to PA6 relate to the same determination criteria as the image patterns P3 to P6 of the first example embodiment, the description thereof will be omitted, and only the image patterns PA1, PA2, and PA7 will be described in the following. Note that the image pattern PA6 is an image pattern that is not included in any of PA1 to PA5 and PA7.

(1) Image Pattern PA1 (Bright Image)

The image pattern PA1 is a pattern of a bright image in which only the highest (highest rank) peak is present above the brightness value threshold T2 in the histogram, no peak is present below the brightness value threshold T1 in the histogram, and the total number of pixels less than the threshold T2 is greater than or equal to 15% of the whole number of pixels.

(2) Image Pattern PA2 (Very Bright Image)

The image pattern PA2 is a pattern of a very bright image in which the highest (highest rank) peak and one or more other peaks (for example, the highest peak and either the left-side peak or the right-side peak, or the highest peak and both the left-side peak and the right-side peak) are present above the brightness value threshold T2 in the histogram, no peak is present below the brightness value threshold T1 in the histogram, and the total number of pixels less than the threshold T2 is greater than or equal to 15% of the whole number of pixels.

(3) Image Pattern PA7 (White Image)

The image pattern PA7 is a pattern of a white image having only the highest peak or one or more peaks other than the highest peak above the brightness value threshold T2 in the histogram (for example, an image having the highest peak and the left-side peak or the right-side peak are present, or and image having the highest peak and both the left-side peak and the right-side peak), which is an image in which no peak is present below the brightness value threshold T1 in the histogram and the total number of pixels below the threshold T2 is less than 15% of the whole number of pixels.

One example of the specific image pattern determination process will be described below.

(A) First, it is detected whether or not the highest (highest rank) peak is present below the brightness value threshold T1 in the detection-use histogram or above the brightness value threshold T2 in the detection-use histogram.

If the highest (highest rank) peak is present in one of the range below the brightness value threshold T1 and the range above the brightness value threshold T2, and another peak is present in the other, the image pattern PA5 is determined.

(B) If the highest (highest rank) peak is present in one of the range below the brightness value threshold T1 and the range above the threshold T2, and no peak is present in the other, it is detected in which of the range below the brightness value threshold T1 or the range above the threshold T2 the highest peak is present.

(B-1) If the highest peak is present above the threshold T2, it is further detected whether or not one or more peaks other than the highest peak above the threshold T2 and whether or not the total number of pixels less than the threshold T2 is greater than or equal to 15% of the whole number of pixels.

If there is no peak other than the highest peak and the total number of pixels less than the threshold T2 is greater than or equal to 15% of the whole number of pixels, the image pattern PA1 is determined. If there are one or more peaks other than the highest peak and the total number of pixels less than the threshold T2 is greater than or equal to 15% of the whole number of pixels, the image pattern PA2 is determined. Then, if only the highest peak is present or if the highest peak and one or more other peaks are present and the total number of pixels less than the threshold T2 is less than 15% of the whole number of pixels, the image pattern PA7 is determined.

(B-2) If the highest peak is present below the threshold T1, it is further detected whether or not the total number of pixels above the threshold T1 is greater than or equal to 10% of the whole number of pixels.

If the highest peak is present below the threshold T1 (a peak other than the highest peak may be present) and if the total number of pixels above the threshold T1 is greater than or equal to 10% of the whole number of pixels, the image pattern PA3 is determined, and if the highest peak is present below the threshold T1 and if the total number of pixels is less than 10% of the whole number of pixels, the image pattern PA4 is determined.

(C) An image not classified into any of the image patterns PA1 to PA5 and PA7, the image pattern PA6 is determined.

Next, the image pattern-specific conversion process will be described.

The image data-specific conversion process for the image patterns PA1 to PA6 is the same as the image data-specific conversion process for the image patterns P1 to P6 in the first example embodiment except the following points.

The image data conversion process for the image patterns PA1 and PA2 is different from the case of the image patterns P1 and P2 in that, when the value of Ac is less than 0.5, it is corrected to 0.5. Further, the image data conversion process for the image patterns PA3, PA4, and PA5 is different from the case of the image patterns P3, P4, and P5 in that, when the value of Ac exceeds 1.5, it is corrected to 1.5.

In the following, the description of the image data-specific conversion process of the image patterns PA1 to PA6 will be omitted, and only the image data conversion process for the image pattern PA7 will be described.

(E) Details of Process for Image Pattern PA7

With white images, attempt to enhance the contrast by using histogram expansion often causes a portion represented in light gray to be blackened. Further, attempt to obtain the same effect by using gamma correction causes the entire image to be darkened.

Figure 30:
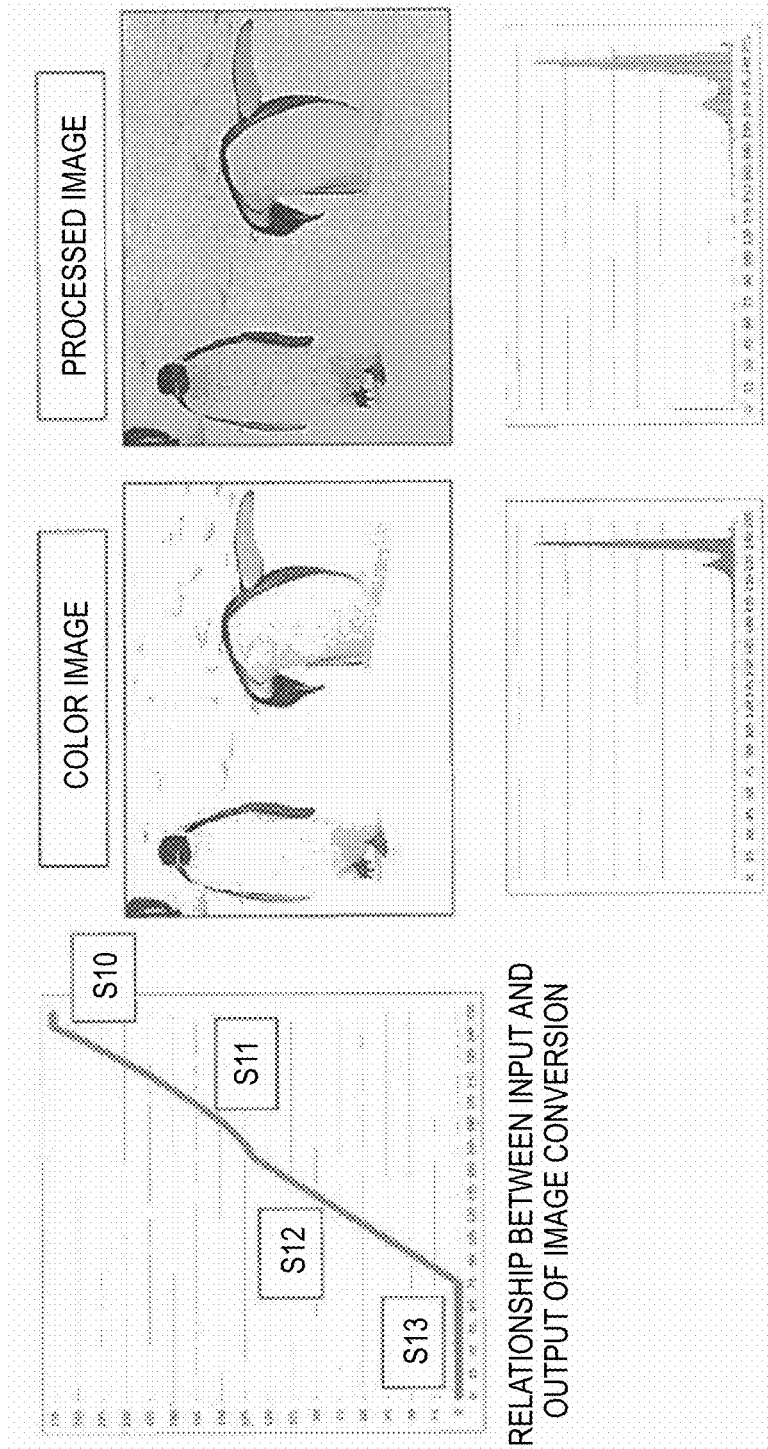
FIG. 30 is a diagram illustrating details of a process for an image pattern PA7 in the second example embodiment.

In the image data conversion device of the present example embodiment, in order to solve the problem described above, the brightness value is fixed to 255 for the brightness value in a predetermined range S10 from the brightness value 255, as illustrated in FIG. 30. Gamma correction is performed for the brightness value in a predetermined range S11, and gamma correction is performed also for the brightness value in a predetermined range S12. The brightness value is fixed to 0 for the brightness value in a predetermined range S13 to the brightness value 0. By doing so, it is possible to widen the representation range of white to the black-side. The images and the histogram of FIG. 30 relate to a color image and an image after the image processing for the image pattern PA7.

The image pattern PA7 is an image in which at least the highest peak is present above the brightness value 180 in the histogram (threshold T2=180) and the number of pixels less than the brightness value 180 is less than 15% of the whole number of pixels.

Figure 31:
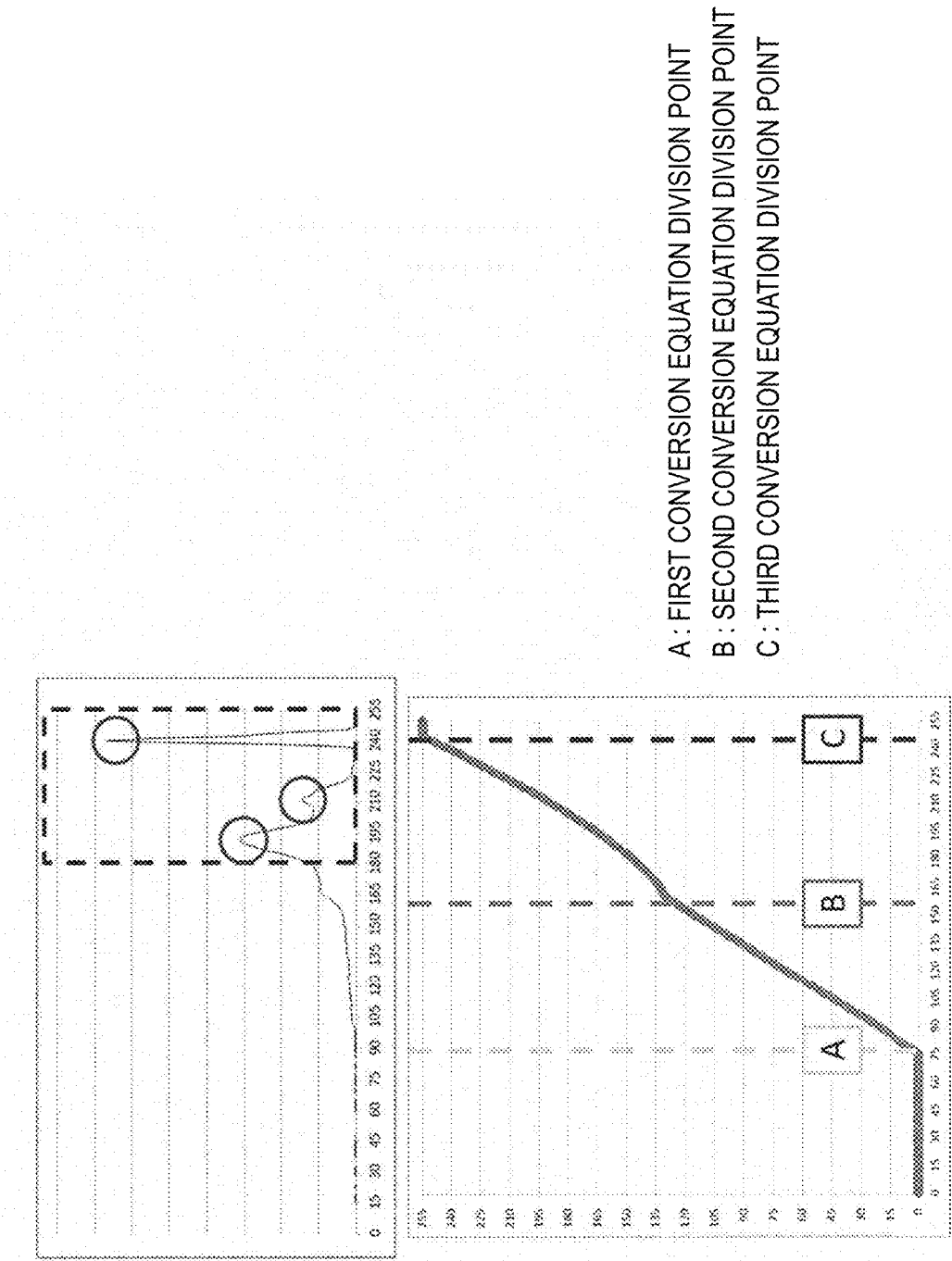
FIG. 31 is a diagram further illustrating details of the process for the image pattern PA7 in the second example embodiment.

The before-conversion brightness value Z is converted to the after-conversion brightness value Z' by a brightness image data conversion equation Math. 5 (equation 5). The brightness value A indicating a division point of the conversion equation illustrated in FIG. 31 is a brightness value of 2% on the black side of the whole number of pixels, the brightness value B is 160 (fixed value), and the brightness value C is a brightness value of 0.1% on the white side of the whole number of pixels. The range S10 to the range S13 described above are determined by these brightness values A, B, and C. When the brightness value A exceeds 120, however, the value is halved.

$$Z' = 0 \ (Z < A)$$
$$Z' = 130 \times \left(\frac{Z-A}{160-A}\right) (A \leq Z < B)$$
$$Z' = \left((B-160) \times \left(\frac{Z-B}{160-B}\right)^{\frac{1}{0.6}}\right) + 130 \ (B \leq Z < C)$$
$$Z' = 255 \ (Z \geq A)$$
[Math. 5]

[Third Example Embodiment]

Figure 32:
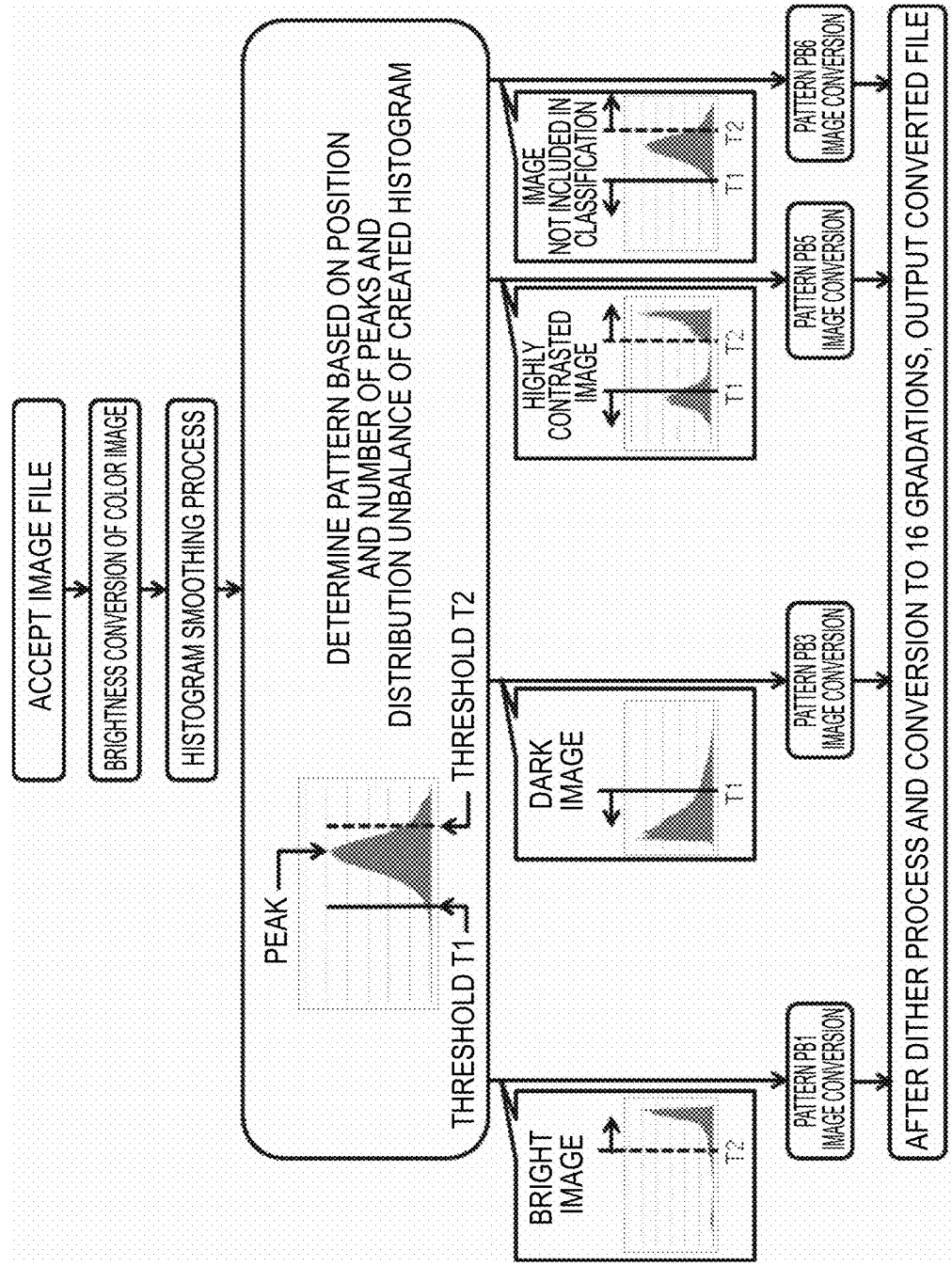
FIG. 32 is a diagram illustrating a process procedure when it is determined which of four image patterns an image is classified into in a third example embodiment of the present invention.

The third example embodiment will be described. In the present example embodiment, as illustrated in FIG. 32, it is determined which of the four types of image patterns PB1, PB3, PB5, and PB6 an accepted image is classified into, and an image pattern-specific conversion process is performed.

While being the same as the configuration of the image data conversion device illustrated in FIG. 9, the configuration of the image data conversion device of the present example embodiment is different in that the image unbalance detection unit 132 of the image pattern determination unit 13 illustrated in FIG. 10 and the second image data conversion unit 142 and the fourth image data conversion unit 144 of the image pattern-specific conversion processing unit 14 are eliminated. The image data conversion process for the image pattern PB1 is performed by the first image data conversion unit 141, the image data conversion process for the image pattern PB3 is performed by the third image data conversion unit 143, the image data conversion process for the image pattern PB5 is performed by the fifth image data conversion unit 145, and the image data conversion process for the image pattern PB6 by the sixth image data conversion unit 146, respectively. In the present example embodiment, since the image unbalance detection is not performed, the image unbalance detection unit 132 is eliminated.

In the present example embodiment, the image pattern determination process (step S206 of FIG. 13) sets the brightness value 96 as the brightness value threshold T1 in the histogram and brightness value 180 as the threshold T2 and determines whether the highest (highest rank) peak of an image is present in the range above the brightness value threshold T2 in the histogram or present in the range below the brightness value threshold T1 in the histogram. From the result of this determination, in the image pattern, it is determined which of the four types of the image patterns PB1, PB3, PB5, and PB6 an accepted image is classified into based on the position of the highest (highest rank) peak of the image. Since the determination criteria for the image patterns PB5 and PB6 are the same as those for the image patterns P5 and P6 of the first example embodiment, the description thereof will be omitted, and only the image patterns PB1 and PB3 will be described below. Note that the image pattern PB6 is an image pattern not included in PB1, PB3, or PB5.

(1) Image Pattern PB1 (Bright Image)

The image pattern PB1 is a pattern of a bright image in which the highest (highest rank) peak is present above the brightness value threshold T2 in the histogram, and no peak is present below the brightness value threshold T1 in the histogram.

(2) Image Pattern PB3 (Dark Image)

The image pattern PB3 is a dark image in which the highest (highest rank) peak is present below the brightness value threshold T1 in the histogram, and no peak is present above the brightness value threshold T2 in the histogram.

The specific image pattern determination process is as follows.

(A) First, it is detected whether or not the highest (highest rank) peak is present in any of the range below the brightness value threshold T1 in the detection-use histogram and the range above the brightness value threshold T2 in the detection-use histogram. If the highest (highest rank) peak is present in one of the range below the brightness value threshold T1 and the range above the threshold T2, and another peak is present in the other, the image pattern PB5 is determined.

(B) If the highest (highest rank) peak is present in one of the range below the brightness value threshold T1 and the range above the brightness value threshold T2, and no peak is present in the other, it is detected in which of the range below the brightness value threshold T1 or the range above the brightness value threshold T2 the highest peak is present. The image pattern PB1 is determined if the highest (highest rank) peak is present above the threshold T2, and the image pattern PB3 is determined if the highest (highest rank) peak is present below the threshold T1.

(C) An image not classified into any of the image patterns PB1, PB3, and PB5, the image pattern PB6 is determined.

Next, the image pattern-specific conversion process will be described.

The image data-specific conversion process for the image patterns PB1, PB3, P5, and P6 is the same as the image data-specific conversion process for the image patterns P1, P3, P5, and P6 in the first example embodiment except the following points.

The image data conversion process for the image pattern PB1 is different from the case of the image pattern P1 in that, when the value of Ac is less than 0.5, it is corrected to 0.5. Further, the image data conversion process for the image pattern PB3 is different from the case of the image pattern P3 in that, when the value of Ac exceeds 1.5, it is corrected to 1.5. Further, the image data conversion process for the image pattern PB5 is different from the case of the image pattern P5 in the first example embodiment in that, when the value of Ac exceeds 1.5, it is corrected to 1.5.

[Fourth Example Embodiment]

A POS terminal device on which an image data conversion device is mounted will be described as a fourth example embodiment of the present invention.

Figure 33:
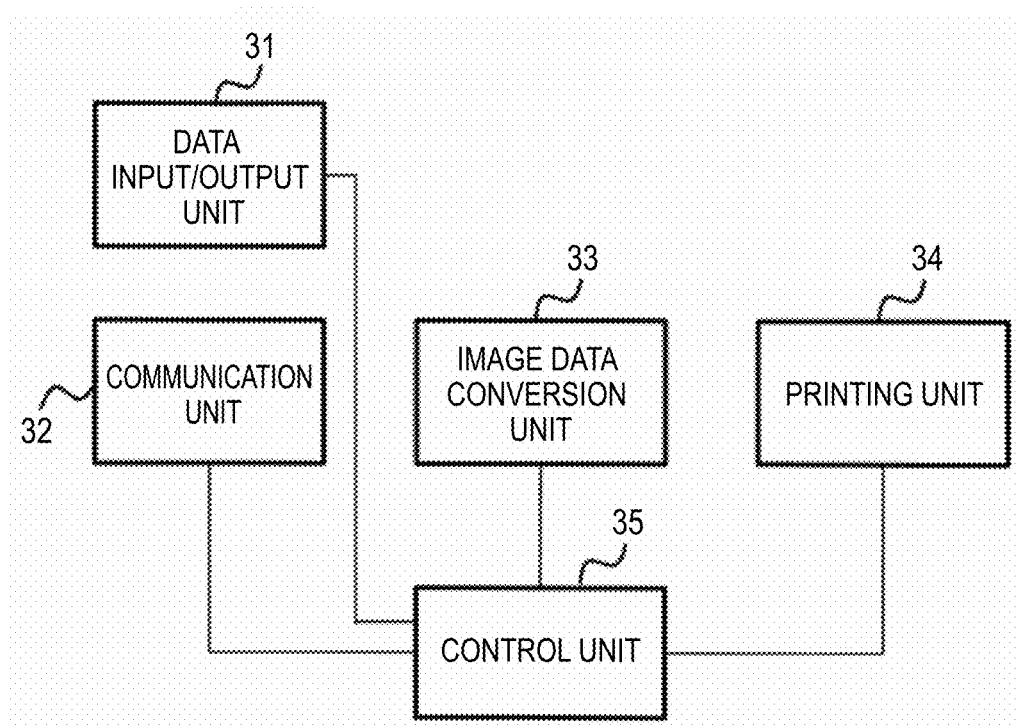
FIG. 33 is a block diagram illustrating a configuration of a POS terminal device of a fourth example embodiment of the present invention on which an image data conversion device is mounted.

As illustrated in FIG. 33, the POS terminal device of the present example embodiment has a data input/output unit 31, a communication unit 32, an image data conversion unit 33, a printing unit 34, and a control unit 35. The data input/output unit 31 is used for input of information on an item to be settled, input of color image data, or the like. The communication unit 32 communicates with other devices. The image data conversion unit 33 converts color image data to black-and-white 16-gradation data. The printing unit 34 is a single-color printer unit such as a thermal printer unit, a monochrome laser printer unit, or the like and prints a receipt or the like. The printing unit 34 may be separated as a single-color printer such as a thermal printer, a monochrome laser printer, or the like and connected to a main unit having the data input/output unit 31, the communication unit 32, the image data conversion unit 33, and the control unit 35 through a cable such as an RS-232C cable, a USB cable, or the like. The control unit 35 controls the operation of the data input/output unit 31, the communication unit 32, the image data conversion unit 33, and the printing unit 34.

The operation of the POS terminal device will be described. The POS terminal device accepts color image data from a USB memory, an SD memory card, or the like via the data input/output unit 31. Further, the POS terminal device receives color image data via the communication unit 32 over a communication network. Any of the image data conversion devices of the first to third example embodiments can be used as the image data conversion unit 33. The POS terminal device causes the image data conversion unit 33 to convert color image data input from the data input/output unit 31 or the communication unit 32 to black-and-white 16-gradation data for storage. The POS terminal device uses the converted black-and-white 16-gradation data to print an image on a receipt or the like by using the printing unit 34.

The POS terminal device may output black-and-white 16-gradation data to a USB memory, an SD memory card, or the like via the data input/output unit 31 or to the outside via a communication network such as a LAN via the communication unit 32, if necessary.

[Fifth Example Embodiment]

An image data conversion system in which a color image data file is accepted via a communication network from a terminal device (a personal computer, a POS terminal device, or the like) installed in a shop or the like and converted to the black-and-white 16-gradation data by the image data conversion device of a server for transmission to the terminal device will be described as a fifth example embodiment of the present invention.

Figure 34:
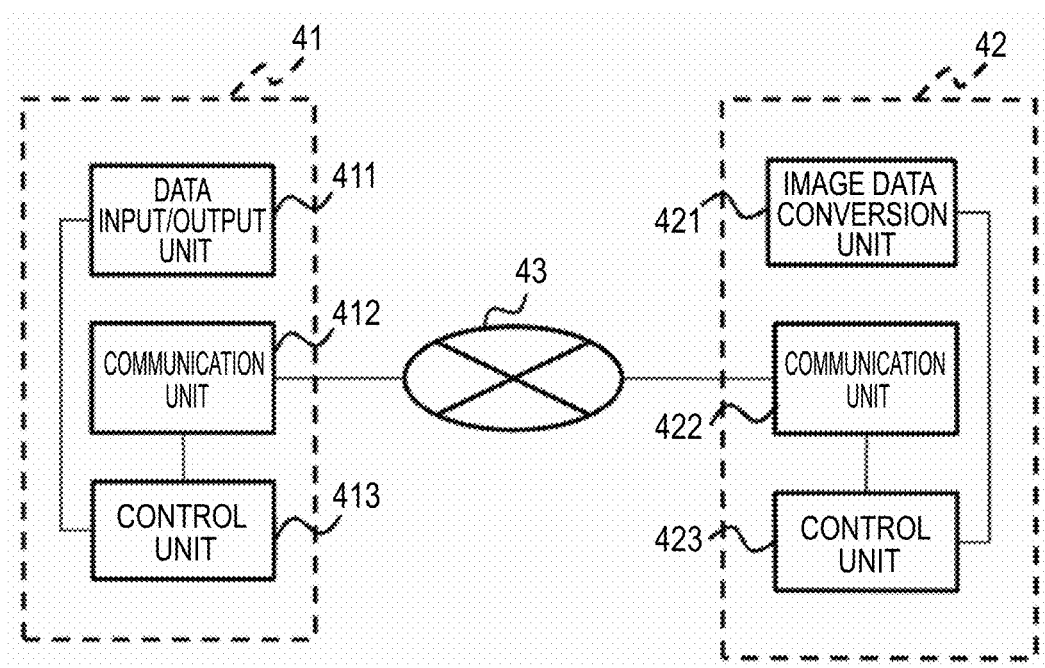
FIG. 34 is a block diagram illustrating a configuration of an image data conversion system of a fifth example embodiment of the present invention that performs image data conversion by using an image data conversion device of a server for transmission to a terminal device.

As illustrated in FIG. 34, the image data conversion system of the present example embodiment has a terminal device 41 and a server 42 connected to the terminal device 41 via the communication network 43. The terminal device 41 is a personal computer or a POS terminal device and has a data input/output unit 411, a communication unit 412, and a control unit 413. The data input/output unit 411 accepts color image data from a USB memory, an SD memory card, or the like. The communication unit 412 communicates with the server 42. The control unit 413 controls the operation of the data input/output unit 411 and the communication unit 412.

The server 42 has an image data conversion unit 421, a communication unit 422, and a control unit 423. The communication unit 422 communicates with the terminal device 41. Any of the image data conversion devices of the first to third example embodiments may be used as the image data conversion unit 421, and the image data conversion unit 421 converts color image data input via the communication unit 422 to black-and-white 16-gradation data. The control unit 423 controls the operation of the image data conversion unit 421 and the communication unit 422.

The operation of the image data conversion system will be described. The terminal device 41 transmits color image data to the server 42 via the communication network 43. The server 42 converts the received color image data to black-and-white 16-gradation data and transmits the black-and-white 16-gradation data to the terminal device 41. The terminal device 41 receives the black-and-white 16-gradation data by the communication unit 412 and outputs the black-and-white 16-gradation data to a USB memory, an SD memory card, or the like by the data input/output unit 411. The terminal device 41 may be provided with a single-color printer such as a thermal printer unit, a monochrome laser printer unit, or the like, or the terminal device 41 may be connected to a single-color printer such as a thermal printer, a monochrome laser printer, or the like via a cable such as an RS-232C cable, a USB cable, and thereby the black-and-white 16-gradation data received by the communication unit 412 may be used for printing by the single-color printer unit or the single-color printer.

The configurations of the preferred example embodiments of the present invention have been described above. It should be noted, however, that such example embodiments are mere examples of the present invention and not at all intended to limit the present invention thereto. Those skilled in the art would readily understand that various modifications and changes are possible in accordance with a specific application without departing from the spirit of the present invention.

The whole or part of the example embodiments disclosed above can be described as, but not limited to, the following supplementary notes.

(Supplementary Note 1)

An image data conversion device comprising:

gray scale operation means for representing color image data in gray scale;

histogram creation means for creating a histogram of brightness values for the gray-scaled image data;

determination means for, based on the created histogram, determining which image pattern of a plurality of image patterns the gray-scaled image data is classified into; and image data conversion means for setting a range subjected to gamma correction and a range fixed to at least one of a minimum value and a maximum value of gray scale for each image pattern and performing image data conversion including the gamma correction on the gray-scaled image data.

(Supplementary Note 2)

The image data conversion device according to supplementary note 1, wherein the determination means performs determination of the image pattern based on the number of peaks, a peak position, and a degree of unbalance of pixels within a predetermined range of the histogram.

(Supplementary Note 3)

The image data conversion device according to supplementary note 1, wherein the determination means performs determination of the image pattern based on a peak position within a predetermined range of the histogram.

(Supplementary Note 4)

The image data conversion device according to any one of supplementary notes 1 to 3, wherein, after image data conversion is performed by the image data conversion means, the gray-scaled image data is converted to image data having less gradations than the gray-scaled image data.

(Supplementary Note 5)

The image data conversion device according to any of supplementary notes 1 to 4, wherein the histogram is a histogram in which unevenness has been smoothed with a moving average.

(Supplementary Note 6)

An image data conversion method in an image data conversion device, the method comprising:

representing color image data in gray scale;

creating a histogram of brightness values for the gray-scaled image data;

based on the created histogram, determining which image pattern of a plurality of image patterns the gray-scaled image data is classified into; and setting a range subjected to gamma correction and a range fixed to at least one of a minimum value and a maximum value of gray scale for each image pattern and performing image data conversion including the gamma correction on the gray-scaled image data.

(Supplementary Note 7)

The image data conversion method according to supplementary note 6, wherein the determination of the image pattern is performed based on the number of peaks, a peak position, and a degree of unbalance of pixels within a predetermined range of the histogram.

(Supplementary Note 8)

The image data conversion method according to supplementary note 6, wherein the determination of the image pattern is performed based on a peak position within a predetermined range of the histogram.

(Supplementary Note 9)

The image data conversion program according to any one of supplementary notes 6 to 8, wherein, after image data conversion is performed, the gray-scaled image data is converted to image data having less gradations than the gray-scaled image data.

(Supplementary Note 10)

The image data conversion device according to any of supplementary notes 6 to 9, wherein the histogram is a histogram in which unevenness has been smoothed with a moving average.

(Supplementary Note 11)

An image data conversion program that causes a computer to function as:

means for representing color image data in gray scale;

means for creating a histogram of brightness values for the gray-scaled image data;

means for, based on the created histogram, determining which image pattern of a plurality of image patterns the gray-scaled image data is classified into; and means for setting a range subjected to gamma correction and a range fixed to at least one of a minimum value and a maximum value of gray scale for each image pattern and performing image data conversion including the gamma correction on the gray-scaled image data.

(Supplementary Note 12)

The image data conversion program according to supplementary note 11, wherein the determination of the image pattern is performed based on the number of peaks, a peak position, and a degree of unbalance of pixels within a predetermined range of the histogram.

(Supplementary Note 13)

The image data conversion program according to supplementary note 11, wherein the determination of the image pattern is performed based on a peak position within a predetermined range of the histogram.

(Supplementary Note 14)

The image data conversion program according to any one of supplementary notes 11 to 13, wherein, after image data conversion is performed, the gray-scaled image data is converted to image data having less gradations than the gray-scaled image data.

(Supplementary Note 15)

The image data conversion program according to any of supplementary notes 11 to 14, wherein the histogram is a histogram in which unevenness has been smoothed with a moving average.

(Supplementary Note 16)

A computer storing the image data conversion program according to any of supplementary notes 11 to 15 in a storage unit, wherein a CPU represents the color image data by the gray scale to convert the color image data to black-and-white image data based on the image data conversion program.

(Supplementary Note 17)

A POS terminal device comprising: the image data conversion device according to any one of supplementary notes 1 to 5; and a printing unit that uses black-and-white image data converted by the image data conversion device for printing.

(Supplementary Note 18)

A server connected to a terminal device via a communication network, the server comprising:

the image data conversion device according to any one of supplementary notes 1 to 5; and a communication unit that receives color image data from the terminal device, converts the received color image data to black-and-white image data by using the image data conversion device, and transmits the converted black-and-white image data to the terminal device.

INDUSTRIAL APPLICABILITY

The present invention is applied to an image data conversion device that represents color image data in gray scale and converts the color image data to black-and-white image data, and the image data conversion device can be preferably used for a POS terminal device and a server connected to the terminal device.

While the present invention has been described above with reference to the example embodiments, the present invention is not limited to the example embodiments described above. Various changes that can be understood by those skilled in the art within the scope of the present invention can be made to the configuration or details of the present invention.

This application is based upon and claims the benefit of priority from Japanese Patent Application No. 2016-020464, filed on Feb. 5, 2016, the disclosure of which is incorporated herein in its entirety by reference.

The invention claimed is:

1. An image data conversion device that represents color image data in gray scale to convert the color image data to black-and-white image data, the image data conversion device comprising:

gray scale operation unit configured to represent the color image data in gray scale;

histogram creation unit configured to create a histogram of brightness values for gray-scaled image data;

determination unit configured to, based on created histogram, determine which image pattern of image patterns of bright image, a dark image, a highly contrasted image whose contrast that is a difference in a brightness between a bright portion and a dark portion is significantly large, and an image which is not included in any of the bright image, the dark image, and the highly contrasted image the gray-scaled image data is classified into; and image data conversion unit configured to, in accordance with which image of the bright image, the dark image, the highly contrasted image, and the image not included any of the above a determined image pattern is classified into, set a brightness value range on which gamma correction is performed for the gray-scaled image data, set a brightness value range on which correction for fixing a brightness value to at least one of a minimum value and a maximum value of gray scale is performed for the gray-scaled image data, and perform image data conversion including the gamma correction and correction for fixing a brightness value to at least one of the minimum value and the maximum value of the gray scale for the gray-scaled image data, wherein the bright image is an image in which a peak having the highest brightness value is present above a second threshold greater than a first threshold of a brightness value in the histogram and the peak is not present below the first threshold, wherein the dark image is an image in which the peak is present below the first threshold, the total number of pixels above the first threshold is greater than or equal to 10% of the whole number of pixels, and the peak is not present above the second threshold, and wherein the highly contrasted image is an image in which the peak is present one of a range below the first threshold and a range above the second threshold and another peak is present in the other.

2. The image data conversion device according to claim 1, wherein the determination unit performs determination of the image pattern based on the number of peaks, a peak position, and a degree of unbalance of pixels within a predetermined range of the histogram.

3. The image data conversion device according to claim 1, wherein the determination unit performs determination of the image pattern based on a peak position within a predetermined range of the histogram.

4. The image data conversion device according to claim 1, wherein, after the image data conversion is performed by the image data conversion unit, the gray-scaled image data is converted to image data having less gradations than the gray-scaled image data.

5. The image data conversion device according to claim 1, wherein the histogram is a histogram in which unevenness has been smoothed with a moving average.

6. A POS terminal device comprising:
the image data conversion device according to claim 1; and a printing unit that uses black-and-white image data converted by the image data conversion device for printing.

7. A server connected to a terminal device via a communication network, the server comprising:
the image data conversion device according to claim 1; and
a communication unit that receives color image data from the terminal device, converts the received color image data to black-and-white image data by using the image data conversion device, and transmits the converted black-and-white image data to the terminal device.

8. The image data conversion device according to claim 1, wherein the image data conversion unit,
for an image pattern of the bright image, performs the gamma correction on a range from the minimum value of the gray scale to a first predetermined brightness value and performs the correction for fixing a brightness value to the maximum value of the gray scale for a range from a value greater than the first predetermined brightness value to the maximum value of the gray scale, for an image pattern of the dark image, performs the gamma correction on a range from the maximum value of the gray scale to a second predetermined brightness value and performs the correction for fixing a brightness value to the minimum value of the gray scale for a range from a value less than the second predetermined brightness value to the minimum value of the gray scale, for an image pattern of the highly contrasted image, performs the gamma correction for a range from the maximum value of the gray scale to a third predetermined brightness value and performs correction for fixing a brightness value to the minimum value of the gray scale for a range a value less than the third predetermined brightness value to the minimum value of the gray scale, and for an image pattern of an image not included in any of the bright image, the dark image, and the highly contrasted image, performs the correction for fixing a brightness value to the maximum value of the gray scale for a range from the maximum value of the gray scale to a fourth predetermined brightness value, performs the correction for fixing a brightness value to the minimum value of the gray scale for a range from a fifth predetermined brightness value to the minimum value of the gray scale, and performs the gamma correction for a range from a value less than the fourth predetermined brightness value to a value greater than the fifth predetermined brightness value.

9. An image data conversion method of an image data conversion device that represents color image data in gray scale to convert the color image data to black-and-white image data, the image data conversion method comprising:
representing the color image data in gray scale;
creating a histogram of brightness values for a gray-scaled image data;
based on a created histogram, determining which image pattern of image patterns of bright image, a dark image, a highly contrasted image whose contrast that is a difference in a brightness between a bright portion and a dark portion is significantly large, and an image which is not included in any of the bright image, the dark image, and the highly contrasted image the gray-scaled image data is classified into; and
in accordance with which image of the bright image, the dark image, the highly contrasted image, and the image not included any of the above a determined image pattern is classified into, setting a brightness value range on which gamma correction is performed for the gray-scaled image data, setting a brightness value range on which correction for fixing a brightness value to at least one of a minimum value and a maximum value of gray scale is performed for the gray-scaled image data, and performing image data conversion including the gamma correction and correction for fixing a brightness value to at least one of the minimum value and the maximum value of the gray scale for the gray-scaled image data, wherein the bright image is an image in which a peak having the highest brightness value is present above a second threshold greater than a first threshold of a brightness value in the histogram and the peak is not present below the first threshold, wherein the dark image is an image in which the peak is present below the first threshold, the total number of pixels above the first threshold is greater than or equal to 10% of the whole number of pixels, and the peak is not present above the second threshold, and wherein the highly contrasted image is an image in which the peak is present one of a range below the first threshold and a range above the second threshold and another peak is present in the other.

10. A non-transitory storage medium storing an image data conversion program that causes a computer as an image data conversion device that represents color image data by gray scale to convert the color image data to black-and-white image data to execute:

representing the color image data in gray scale;

creating a histogram of brightness values for a gray-scaled image data;

based on a created histogram, determining which image pattern of image patterns of bright image, a dark image, a highly contrasted image whose contrast that is a difference in a brightness between a bright portion and a dark portion is significantly large, and an image which is not included in any of the bright image, the dark image, and the highly contrasted image the gray-scaled image data is classified into; and in accordance with which image of the bright image, the dark image, the highly contrasted image, and the image not included any of the above a determined image pattern is classified into, setting a brightness value range on which gamma correction is performed for the gray-scaled image data, setting a brightness value range on which correction for fixing a brightness value to at least one of a minimum value and a maximum value of gray scale is performed for the gray-scaled image data, and performing image data conversion including the gamma correction and correction for fixing a brightness value to at least one of the minimum value and the maximum value of the gray scale for the gray-scaled image data, wherein the bright image is an image in which a peak having the highest brightness value is present above a second threshold greater than a first threshold of a brightness value in the histogram and the peak is not present below the first threshold, wherein the dark image is an image in which the peak is present below the first threshold, the total number of pixels above the first threshold is greater than or equal to 10% of the whole number of pixels, and the peak is not present above the second threshold, and wherein the highly contrasted image is an image in which the peak is present one of a range below the first threshold and a range above the second threshold and another peak is present in the other.

11. A computer storing the image data conversion program according to claim 10 in a storage unit, wherein a CPU represents the color image data in gray scale to convert the color image data to black-and-white image data based on the image data conversion program.

* * * * *

UNITED STATES PATENT AND TRADEMARK OFFICE
CERTIFICATE OF CORRECTION

PATENT NO. : 10,643,318 B2  
APPLICATION NO. : 16/070093  
DATED : May 5, 2020  
INVENTOR(S) : Shou Yazawa and Yukio Yoshioka Page 1 of 1

It is certified that error appears in the above-identified patent and that said Letters Patent is hereby corrected as shown below:

In the Specification

Column 7, Description of Embodiments, Line 52; After "unit", insert --14--

Signed and Sealed this  
Twenty-fourth Day of November, 2020

Andrei Iancu  
*Director of the United States Patent and Trademark Office*